US008826684B2

United States Patent
Burk

(10) Patent No.: US 8,826,684 B2
(45) Date of Patent: *Sep. 9, 2014

(54) ROTATING VALVE AND HEAT PUMP

(75) Inventor: Roland Burk, Stuttgart (DE)

(73) Assignee: Behr GmbH & Co. KG, Stuttgart (DE)

(*) Notice: Subject to any disclaimer, the term of this patent is extended or adjusted under 35 U.S.C. 154(b) by 152 days.

This patent is subject to a terminal disclaimer.

(21) Appl. No.: 13/367,959

(22) Filed: Feb. 7, 2012

(65) Prior Publication Data

US 2012/0198881 A1    Aug. 9, 2012

Related U.S. Application Data

(63) Continuation of application No. PCT/EP2010/061470, filed on Aug. 6, 2010.

(30) Foreign Application Priority Data

Aug. 7, 2009   (DE) .................. 10 2009 036 544

(51) Int. Cl.
| F25B 13/00 | (2006.01) |
| F16K 11/076 | (2006.01) |
| F25B 17/08 | (2006.01) |
| F25B 49/04 | (2006.01) |
| F25B 35/04 | (2006.01) |

(52) U.S. Cl.
CPC ............... *F25B 49/046* (2013.01); *F25B 35/04* (2013.01); *F16K 11/076* (2013.01); *F25B 17/083* (2013.01)
USPC ........................................ 62/324.6; 62/515

(58) Field of Classification Search
USPC ........ 62/324.6, 216, 515, 324.1; 165/96, 163, 165/166; 251/304
See application file for complete search history.

(56) References Cited

U.S. PATENT DOCUMENTS

| 4,574,874 | A | 3/1986 | Duran |
| 8,621,883 | B2* | 1/2014 | Burk et al. ............... 62/324.6 |
| 2009/0000327 | A1 | 1/2009 | Burk et al. |
| 2011/0030408 | A1 | 2/2011 | Burk et al. |

FOREIGN PATENT DOCUMENTS

| DE | 10 2008 060 698 A1 | 8/2009 |
| EP | 1 428 990 A1 | 6/2004 |
| JP | H 10-206073 A | 8/1998 |
| JP | 2000-324946 A | 11/2000 |
| JP | 2002-039406 A | 2/2002 |
| WO | WO 98/50739 A2 | 11/1998 |
| WO | WO 02/12800 A1 | 2/2002 |
| WO | WO 2004/059221 A1 | 7/2004 |
| WO | WO 2007/068481 A1 | 6/2007 |
| WO | WO 2009/024412 A1 | 2/2009 |
| WO | WO 2009/024580 A1 | 2/2009 |

* cited by examiner

*Primary Examiner* — Cheryl J Tyler
*Assistant Examiner* — David Teitelbaum
(74) *Attorney, Agent, or Firm* — Muncy, Geissler, Olds & Lowe, P.C.

(57) ABSTRACT

A rotating valve includes an inlet region, an outlet region, and a switching region having a switching member that can be rotated about an axis. In a first position of the switching member the plurality of inlets are connected to the plurality of outlets in a first association, and in a second position of the switching member the plurality of inlets are connected to the plurality of outlets in a second association. The switching member has a plurality of openings through which the fluid flows flow axially in the direction of the rotation axis and are moved together with the switching member. The openings alternately cover a plurality of stationary, axially directed openings in the course of the rotation of the switching member. Different associations of the inlets with the outlets are carried out by the alternating covering of the axially directed openings.

50 Claims, 27 Drawing Sheets

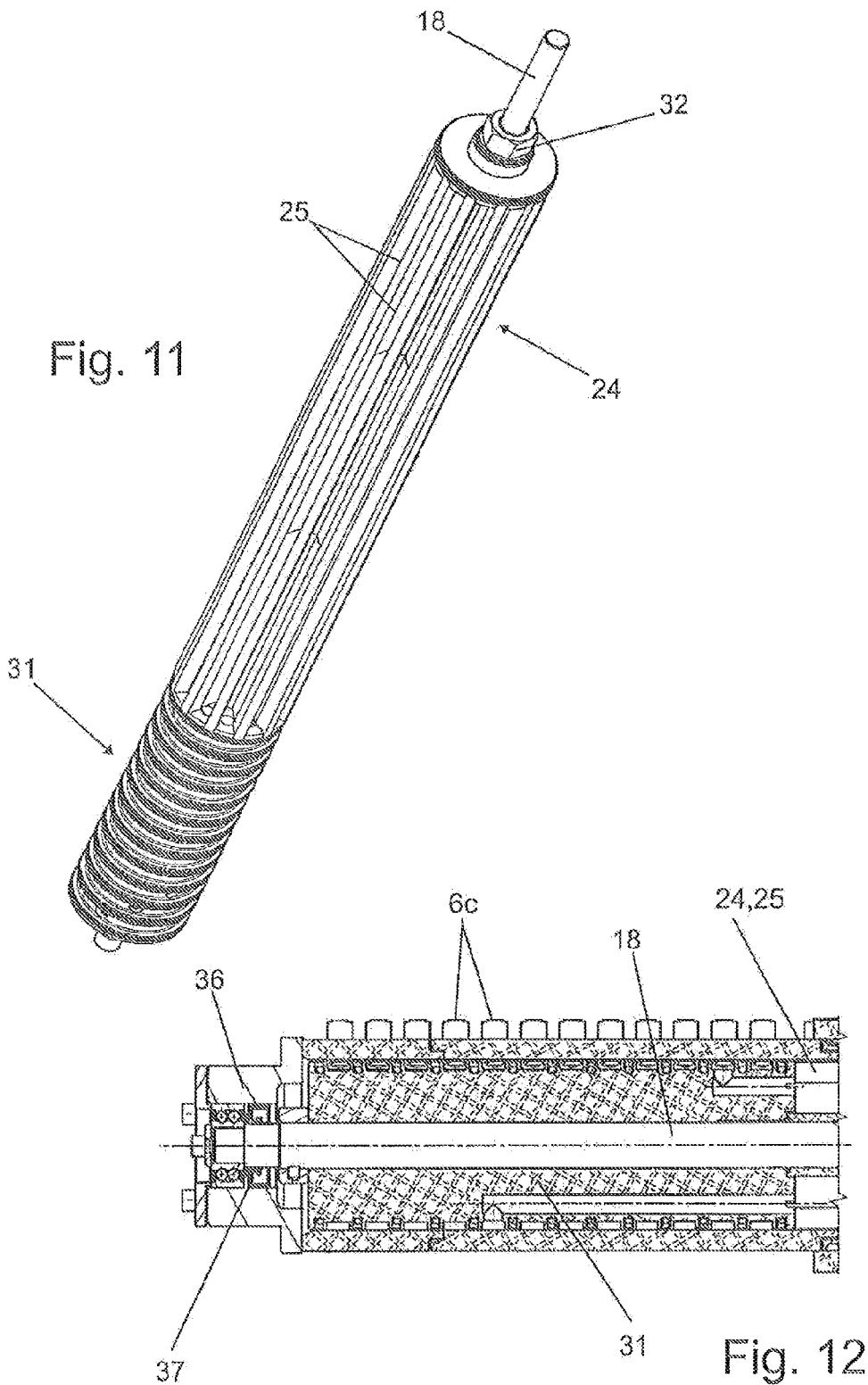

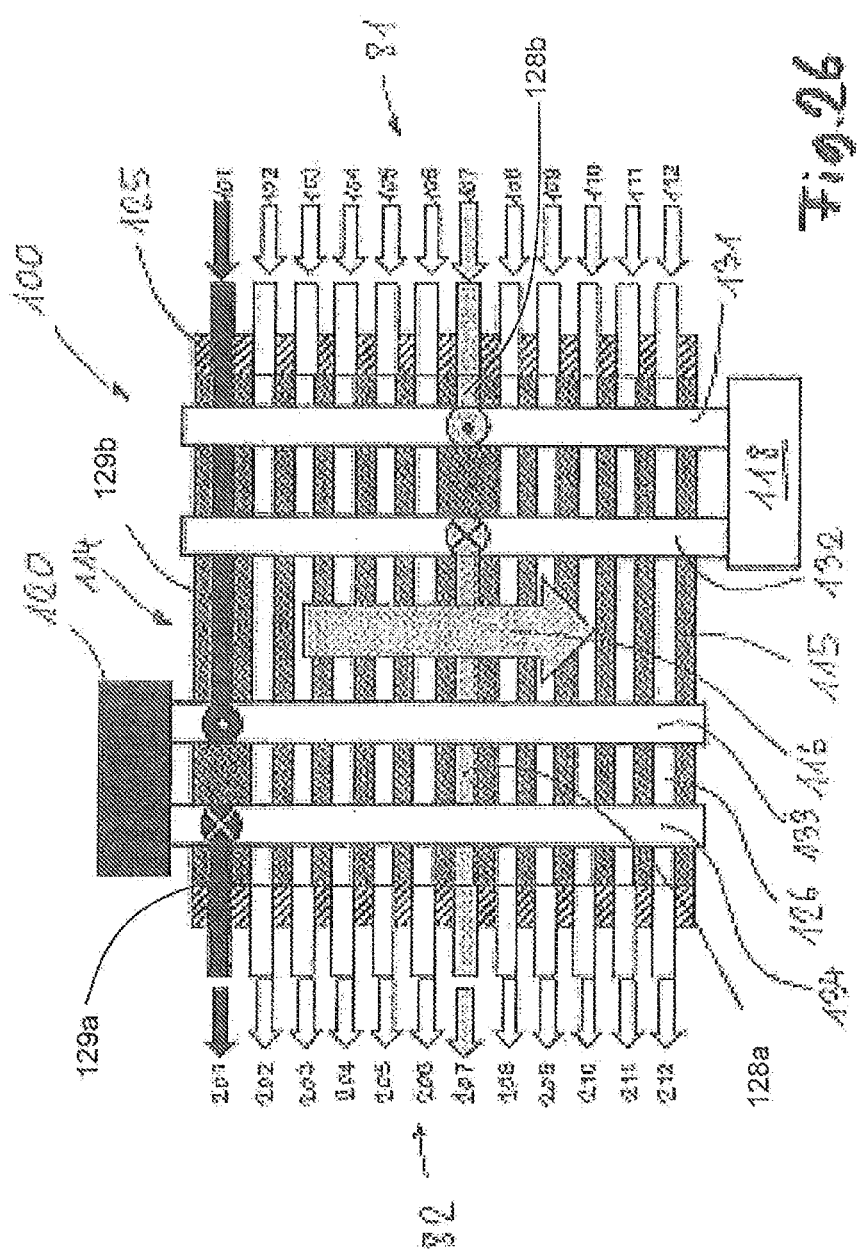

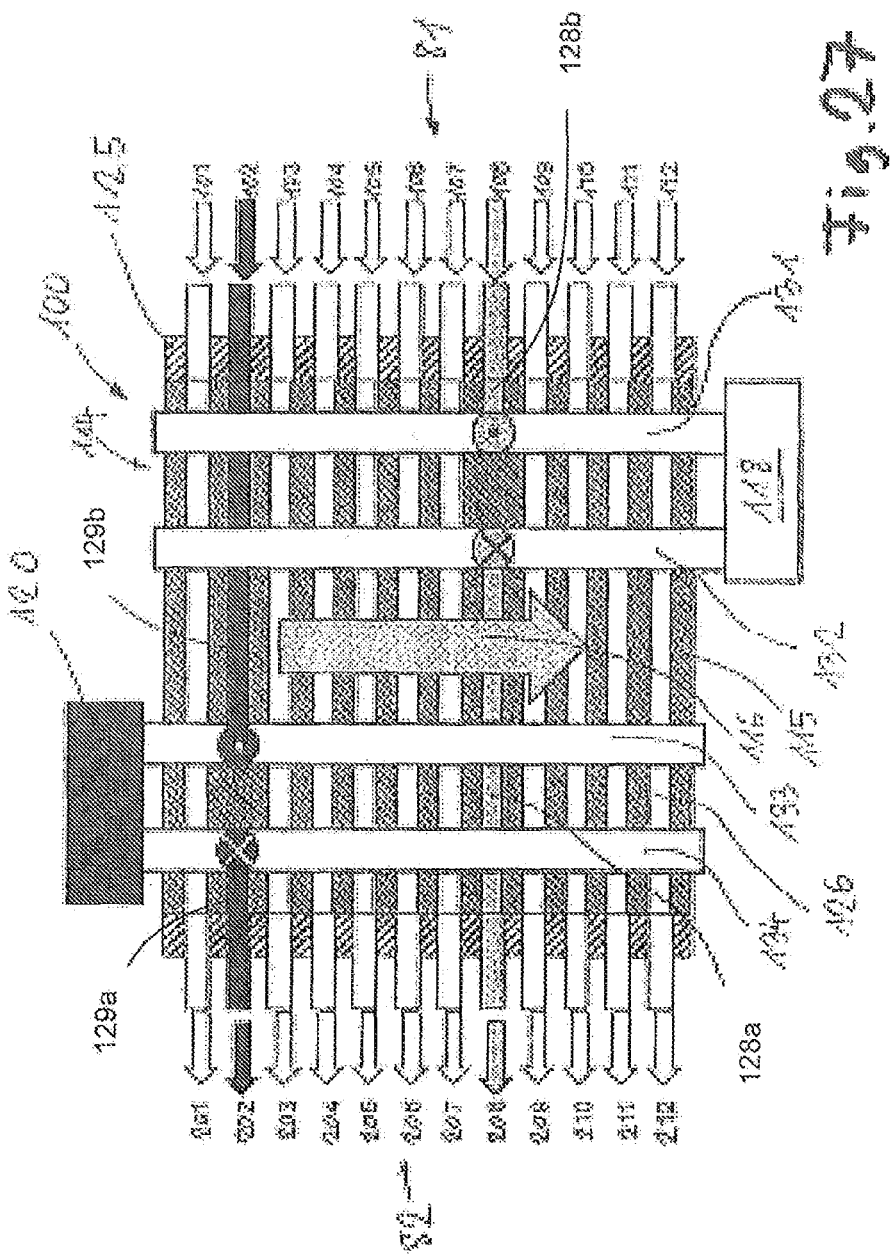

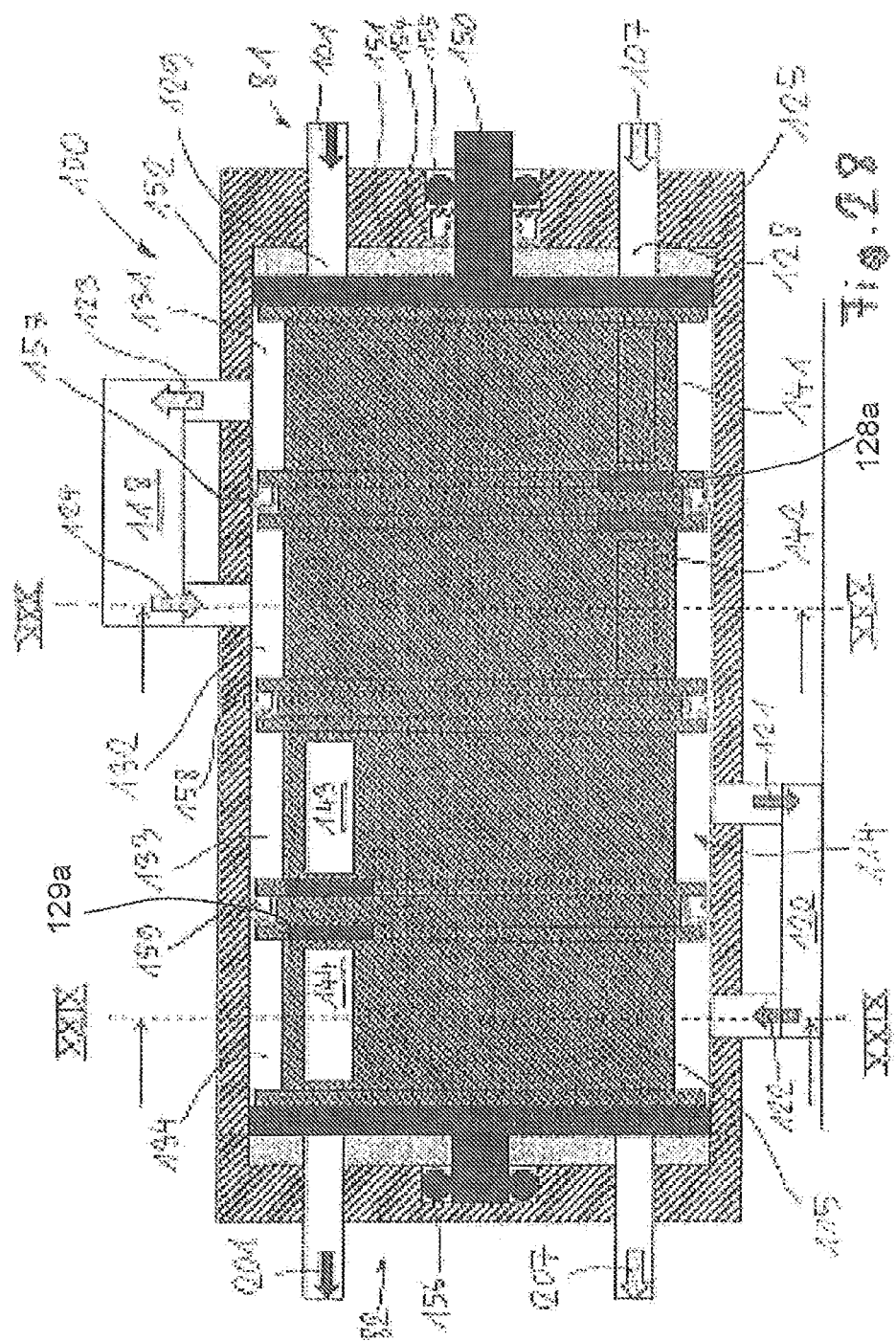

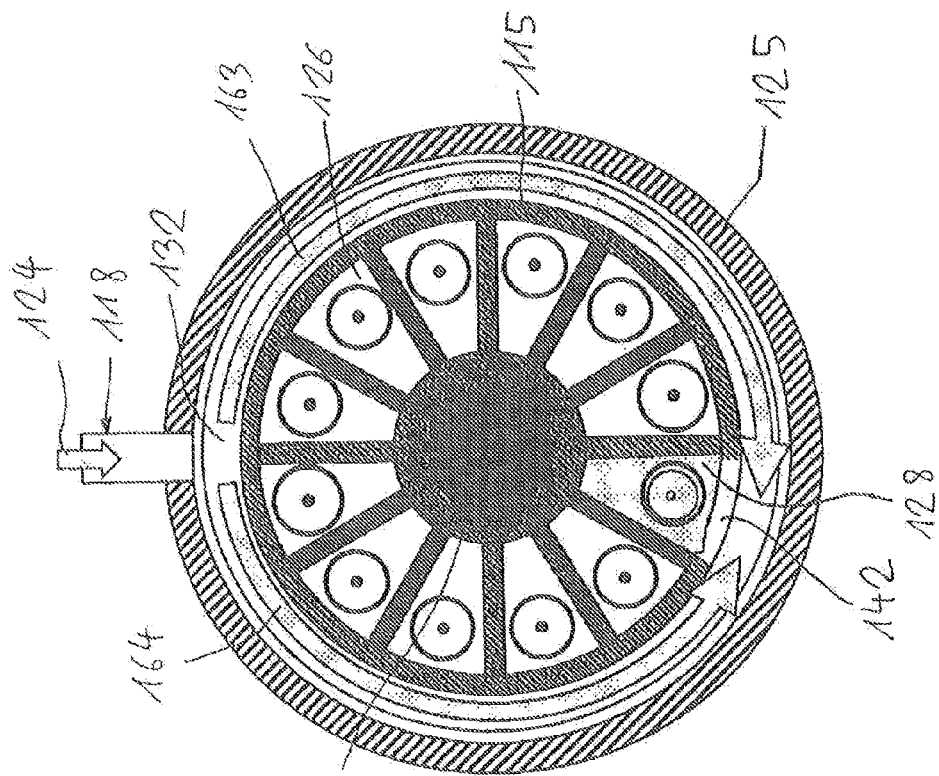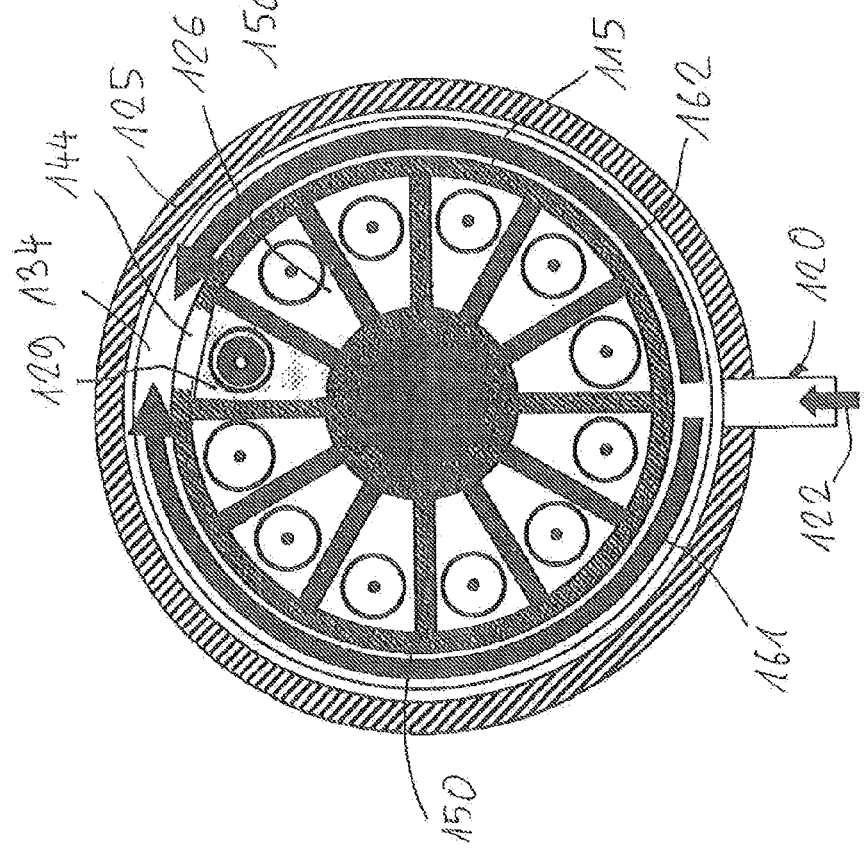

ROTATING VALVE AND HEAT PUMP

This nonprovisional application is a continuation of International Application No. PCT/EP2010/061470, which was filed on Aug. 6, 2010, and which claims priority to German Patent Application No. DE 10 2009 036 544.3, which was filed in Germany on Aug. 7, 2009, and which are both herein incorporated by reference.

BACKGROUND OF THE INVENTION

1. Field of the Invention

The invention relates to a rotating valve and to a heat pump.

2. Description of the Background Art

The use of rotating valves is known, in principle, for the alternating interconnection of a plurality of fluid flows for driving a heat pump which has a large number of particular thermodynamically active flow channels.

WO 2007/068481 A1, which corresponds to US 2009/0000327, which is incorporated herein by reference, describes a heat pump which includes a permanently interconnected stack of plate-type hollow elements, the hollow elements comprising adsorber/desorber regions and each hollow element representing one flow channel. The plurality of flow channels are alternately interconnected in series via pairs of rotating valves disposed at the ends of the hollow elements in order to optimize the power of the heat pump of a given size.

A heat pump according to the definition of the species in the sense of the invention has many possible applications, for example the use of waste heat in steady-state technology, e.g., building technology, solar air conditioning or auxiliary air-conditioning for vehicles, in particular for commercial vehicles.

SUMMARY OF THE INVENTION

It is an object of the invention is to further improve a rotating valve as well as a heat pump with regard to size, construction costs and efficiency.

An effective and particularly compact approach for alternating interconnections of the fluid flows is provided by implementing the switching member of the rotating valve by means of axially oriented openings. Only radially oriented flow openings in the region of the alternating interconnection are known from the conventional art, which results in complex approaches, at least with regard to the installation space, for example double-walled cylinders having radially oriented openings disposed therein which are offset from each other.

A rotating valve according to the invention is suitable not only for controlling a plurality of fluid flows of different temperatures for a heat pump, for example to recover heat, but also, in general, for alternating interconnection of fluid flows, for example for recovering components of a solution, for example in chemical reactors.

In an embodiment, the switching member is designed as an axial longitudinal body which is accommodated in a stationary, largely cylindrical wall, either the inlets or the outlets being connected via radially oriented openings in the wall. This makes it possible to achieve a suitable configuration of inlets and outlets, in particular, in a uniformly spaced, straight line, particularly for connecting a stack of parallel flow channels.

The longitudinal body particularly can have a number of axially oriented, separate channels, which correspond to the plurality of inlets, for the fluid flows, each channel having a radial opening for connection to one of the openings in the wall. The axial, separate channels may be produced, for example by axially longitudinally oriented bores. In particular, the channels may run in a straight and parallel manner, so that a coiling of the channels known from the prior art may be eliminated.

To avoid mixing of adjacent fluid flows, it is particularly preferably provided that at least one of the two, longitudinal body or wall, has annular, circumferential sealing members which interact with the particular other of the two, longitudinal body or wall, to form a seal, so that the axially offset openings in the wall are separated from each other. In the interest of simple manufacturing, annular sealing component are preferably accommodated on radial projections of at least one of the two, longitudinal body or wall. Alternatively or additionally, the sealing component may also be designed as a single piece with the longitudinal body and/or the wall. If a suitable material is selected for the longitudinal body and wall, the material of the corresponding component may simultaneously have a sealing effect, for example if material pairings made of plastics or plastic and metal are suitably selected. A one-piece embodiment of seals on the particular component may also be provided in the sense that the seals of a different material from that of the component are sprayed thereon.

In an embodiment of the invention, the longitudinal body can be designed as a largely one-piece component. This component may be, for example, an injection molded part made of a plastic, which is post-processed by one or multiple post-processing steps, for example by providing bores for longitudinally oriented channels.

In an embodiment, the longitudinal body may also be designed as a plurality of longitudinal body elements which are stacked in the axial direction. A division into multiple longitudinal body elements of this type permits a modular structure, which is easily adaptable to different numbers of flow channels in the sense of an equivalent parts concept. At least some of the longitudinal body elements are preferably designed as equivalent parts.

In another embodiment, the switching member can be penetrated by a rotational shaft in the axial direction, the shaft being designed in a preferred detail design as a tension member for holding multiple components of the switching member which are disposed consecutively in the axial direction. This enables the switching member to be easily removed for maintenance purposes or for replacing worn parts.

In an embodiment, the switching member can be rotationally supported on a bearing member at one end, the bearing member having, in particular, a rotating seal for sealing the fluid. This generally permits precise guidance of the switching member, while reducing friction forces, the rotating seal representing an additional barrier against fluid leakages, which is practical, in particular, in the case of fluids which are harmful to the health or environment. A bearing member may be suitably provided at opposite ends of the switching member.

A rotating valve according to the invention is suitable, for example, for interconnecting a large number of inlets and outlets, so that, in an embodiment, at least four, in particular at least eight, inlets and outlets are present in each case.

In an embodiment, for a rotating valve, a particularly good sealing of the separate channels of the switching member is achieved by providing the separate seal in the end areas of the partition walls as well as providing sealing support therefor, which substantially improves the efficiency and dependability of the rotating valve using simple means, compared to the conventional art.

The seal may have, in particular, a U-shaped, H-shaped or X-shaped cross section. Other suitable cross sections are also conceivable. In an advantageous specific embodiment, the seal can be designed as an elastic sealing tab which rests against the inner wall. The seal can be generally advantageously inserted into a groove in the partition wall in a form-locked manner, which makes it possible to eliminate measures such as adhesion or other complex attachments.

In an embodiment, the channels alternately cover, in a generally advantageous manner, radially oriented openings in the inner wall of a stationary inner cylinder which are offset in the circumferential direction in order to change the assignment, annular chambers which are separate from each other and disposed consecutively in the axial direction being provided between the inner cylinder and an outer housing surrounding this inner cylinder. In this design, the interconnection is achieved by alternately covering radially oriented openings. In this case, a desired separation of the openings and channels may be achieved by a suitable design of the width of the sealing component in the circumferential direction during the course of covering the openings. If the sealing component is provided with a sufficiently wide design, a connection of adjacent flow channels may be prevented at any time in the rotation of the rotating switching member, the average opening times for all of the flow channels being reduced accordingly. Alternatively, a sealing component that is narrower in the circumferential direction may also be provided, whereby to avoid an unfavorable connection of adjacent flow channels, the rotating switching member is rotated in step-like switching movements which are fast enough to avoid mixing the fluid flows.

In a further embodiment of the invention, a compact, reliable and cost-effective connection of inlet channels to rotating switching channels of the switching member is achieved by the concentric, annular grooves. A structural approach of this type is suitable, in particular, for rotating valves which have only relatively few, for example two to four, flow channels. In principle, however, they may also be used for embodiments which have more flow channels. In this approach, it is again suitable that the channels cover, in a generally advantageous manner, radially oriented openings in the inner wall of a stationary inner cylinder which are offset in the circumferential direction in order to change the assignment, separate annular chambers disposed consecutively in the axial direction being provided between the inner cylinder and an outer housing surrounding this inner cylinder.

The combination of a rotating valve according to the invention and a heat pump is particularly advantageous, since the characteristics of the heat pump are also improved with regard to size and power by optimizing the rotating valve with regard to tightness or size.

Furthermore, a particularly good heat transfer between the surrounding fluid and the thermodynamically active regions of the hollow element may be guaranteed by designing the hollow elements as a particular stack of multiple, parallel layers of subelements. This makes it possible to increase the power of the heat pump with a given installation space.

The first fluid, which is exchanged with the first zone, and the second fluid, which is exchanged with the second zone, may ordinarily be different from each other and not have any connection in the circulations. Depending on the requirements, the fluids may, in the sense of the invention, also be fluids of the same substance which may have a connection to each other, depending on the design.

In an embodiment of the heat pump, the hollow elements can be designed as adsorber elements which have an adsorption/desorption region for the working medium in the region of the first zone, and which have a condensation/evaporation region for the working medium in the region of the second zone. Different working media and adsorption/desorption agents may be selected, depending on the area of application of the heat pump.

In an embodiment, at least one of the flow channels has end connecting pieces, the fluid being distributed to a plurality of flow paths in the region of the connecting pieces. In a suitable detail design, one or multiple flow paths for the fluid may be easily provided by one or more gaps between subelements which are disposed on top of each other. In a preferred detail design, the gaps may be provided with surface enlarging, inner structures.

In an embodiment, the hollow elements are each designed as separate modules which, in particular, are not in thermal contact with each other. Unwanted exchange of thermal energy between adjacent flow paths is reduced in this manner. This is important, in particular, for adjacent flow paths which have a high temperature difference in relation to each other, due to the present interconnection. In a preferred refinement, a layer made of thermally insulating, in particular elastic, material may be disposed between adjacent hollow elements. For example, this material may be a foamed material or a fibrous insulating mat.

In an embodiment of the invention, the valve configuration may be designed as an interconnection of a number of discrete, in particular electromagnetically actuated, multiway valves. In heat pumps having a relatively small number of flow paths, in particular, such an interconnection of discrete valves may be suitable, rotating valves according to the invention being advantageous, in particular in the case of an increasing number of flow paths.

In an embodiment, the valve configuration includes at least one, in particular at least two, rotating valves, since the fluid flows may be cost-effectively and reliably switched by the rotating valves according to the invention.

In an advantageous detail design, a least some of the flow channels of the hollow elements are connected to the inlets and/or outlets of the rotating valves via elastic, deformable connecting pieces. Thermally induced expansions of the heat pump may be easily compensated thereby, which is practical, in particular, in the case of large stacks of hollow elements.

In an embodiment of the invention, the second fluid includes air. The air may be conducted directly via the hollow elements, in particular of the second zone, for the purpose of conditioning, such as heating or cooling. Depending on the design and operating mode of the heat pump, the air flow may be used for heating or cooling, for example, a building or vehicle. In the sense of the invention, however, the air may be quite generally viewed as a heat-transporting medium without it being used as conditioned ambient air, for example for people or technical equipment.

In an embodiment according to the invention, the rotating valve of the second fluid has a switching member which has a partition wall coiled in steps, in particular a number of steps in the coil matching a number of hollow elements. A switching member of this type may be combined hereby with an only single-walled, encasing cylinder without it being necessary to provide a continuous coiling of the partition walls, which requires relatively complex manufacturing. A design of this type is desirable, in particular for gaseous fluids such as air at high volumetric flows and simultaneously low pressure differences, since measures such as annular chambers of double-walled outer cylinders might have an interfering effect. In the interest of particularly simple manufacturing, the switching member is formed from a plurality of switching member elements which are disposed consecutively in the axial direction and are designed, in particular, as equivalent parts.

In a further advantageous exemplary embodiment of the invention, the second fluid is distributed over the second zones (B) of the hollow elements via a rotating valve having two flow channels. A distribution of this type over only two channels is advantageous, in particular, for gaseous fluids of relatively low heat capacity, such as air, since large flow cross sections and thus high volumetric flows may be implemented hereby with a small pressure difference.

A further exemplary embodiment, the rotating valve is characterized in that at least one inlet of the plurality of inlets is connected to an associated outlet in a first heat exchanger assignment, in particular via a first heat exchanger, such as a heater. The heat exchanger is preferably a heat source which is disposed outside the rotating valve. At least one additional inlet of the plurality of inlets is connected to an associated outlet in a second heat exchanger assignment, in particular via a second heat exchanger, such as a cooler. The second heat exchanger is preferably a heat sink which is also disposed outside the rotating valve. The remaining inlets of the plurality of inlets are connected to associated outlets in a passage assignment, in particular via one through-channel each. The rotating valve described above may replace two rotating valves driven in phase, as described further below. The number of seals needed may be substantially reduced thereby. Moreover, the friction torques occurring during operation of the rotating valve may be reduced. The rotating valve described above requires less installation space than the rotating valves described below, which, when combined in pairs, perform the same function as a single rotating valve described above. The material consumption for manufacturing a rotating valve of this type is also reduced. In addition, long, internal, parallel fluid paths, which result in unwanted pressure losses, as well as internal heat transfers may be reduced. Furthermore, a synchronous driving in phase of multiple rotating valves, which requires a high degree of control complexity, may be eliminated. The rotating valve according to the invention make it possible to easily connect associated inlet and outlets to each other directly in steps or via one of the two heat exchangers. This enables the manufacturing costs of the rotating valve to be substantially reduced. A more compact, flatter configuration of the overall apparatus is also made possible.

Another exemplary embodiment of the rotating valve is characterized in that the switching member has a rotating body which includes a large number of through-channels which connect the remaining inlets in the passage assignment to the associated outlets. The described rotating valve easily permits the control of a closed fluid circulation through a plurality of thermally active modules, either via one of the heat exchangers, in particular a heat source and a heat sink, or via one of the through-channels in the manner of a bypass past the heat exchangers. The location of the intermediate connection of the heat exchangers between two thermally active modules may be shifted in steps by a movement of the rotating body.

Another exemplary embodiment of the rotating valve is characterized in that the through-channels extend through the rotating body in the axial direction. The through-channels preferably extend in a straight line through the rotating body.

Another exemplary embodiment of the rotating valve is characterized in that multiple, in particular four, annular chambers extend around the rotating body, each of which is connected to one of the inlets and/or one of the outlets as a function of the position of the rotating body. The annular chambers are limited inwardly in the radial direction by the rotating body and radially outwardly by a housing of the rotating valve. In the axial direction, the annular chambers are preferably limited by radial limiting walls which extend radially outward from the rotating body.

Another exemplary embodiment of the rotating valve is characterized in that two of the annular chambers are connected to each other in pairs via one of the heat exchangers. The associated fluid channel runs from one of the inlets to one of the heat exchangers via one of the annular chambers. The fluid chamber then runs from the heat exchanger to the associated outlet via the nearest assigned annular chamber.

Another exemplary embodiment of the rotating valve is characterized in that the annular chambers are connected in pairs to one of the inlets or one of the outlets via radial openings and a connecting channel which is interrupted in the axial direction. The connecting channels are interrupted in such a way that they connect an associated inlet to the associated outlet via one of the heat exchangers. Conversely, the through-channels represent bypasses which permit the fluid to flow past the heat exchangers, i.e., directly between one inlet and the corresponding outlet.

Another exemplary embodiment of the rotating valve is characterized in that the rotating body is designed and rotatable in steps in a stationary housing in such a way that the inlets are successively connected to the associated outlets via different through-channels or the annular chambers and one of the heat exchangers. This easily permits two inlets to be always connected to the associated outlet via one of the heat exchangers. The remaining inlets are connected directly to the associated outlets via the through-channels.

Another exemplary embodiment of the rotating valve is characterized in that the housing largely has the shape of a hollow circular cylinder. The jacket of the hollow circular cylinder is preferably interrupted only by connecting channels which connect the annular chambers to the associated heat exchangers. The inlets and outlets preferably extend through the otherwise closed front walls of the housing.

Another exemplary embodiment of the rotating valve is characterized in that the rotating body includes a plurality of longitudinal body elements which are stacked in the axial direction. The longitudinal body elements may be stacked, for example, on a drive shaft that extends through the rotating valve. The longitudinal body elements may be connected to each other by adhesive force, for example by welding or adhesion. However, it is also possible to clamp the longitudinal body elements to each other.

Another exemplary embodiment of the rotating valve is characterized in that at least some of the longitudinal body elements are designed as equivalent parts. The manufacture and/or mountability of the rotating valve is simplified thereby.

In another exemplary embodiment of a rotating valve, it is provided that a flow passes through a first number of through-channels of the rotating valve in a first flow direction, a flow passing through a second number of through-channels of the rotating valve in a second flow direction which is opposite to the first flow direction. For example, this makes it possible to reverse the direction of flow through a thermally active module when changing processes between adsorption and desorption, on the one hand, and evaporation and condensation, on the other hand. This is advantageous for the overall efficiency of a heat pump, since a better adaptation of the temperature profile along the flow direction is provided in the thermally active modules (e.g., sorption modules) during the cooling and heating processes.

In an embodiment, it is provided that at least one inlet and one outlet of the rotating valve can be connected to a dead-end channel of the rotating valve, the inlet and the outlet of the dead-end channel, in particular, emptying at the same end of the rotating valve. Due to a dead-end channel of this type, the fluid flow may be easily deflected in the opposite direction, the location of the deflection being carried along when the rotating valve is further switched. In a preferred detail design, the dead-end channels run in the axial direction and have radial connecting openings to annular chambers of the rotating valve.

To easily implement different flow directions it is provided in a preferred rotating valve that both the first number of through-channels and the second number of through-channels have an offset over their length in a circumferential direction of the rotating valve, in particular an offset in the size of the distance between adjacent inlets and outlets. The offset of a through-channel is particularly preferably added up from at least one first partial offset and one second partial offset in structural sections of the rotating valve disposed consecutively in the axial direction. This may be advantageous with regard to pressure loss and/or production techniques. In particular, the offset may be added up from more than two partial offsets, for example from four partial offsets.

In an alternative embodiment, the number of through-channels of the first flow direction may preferably but not necessarily differ from the number of through-channels of the second flow direction which is diametrically opposed to the first flow direction.

In an embodiment, a rotating body of the rotating valve has a rotating sealing plate which rests against a stationary sealing plate of a housing and forms a seal over a wide area, the sealing plates being made, in particular, of a ceramic material. A reliable sealing of adjacent through-channels is achieved hereby, the alternating interconnection of the through-channels to inlets and outlets being achieved, in particular, by alternating covering of openings in the sealing plates.

In a further embodiment, a rotating body of the rotating valve includes two partial bodies disposed consecutively in the axial direction, the partial bodies being supported against each other in the axial direction under the application of force. In this manner, for example, end-face and/or other seals may be pressed on under the application of force. In a preferred detail design, a resilient member, by means of which the application of force is at least supported, is provided between the partial bodies. The resilient member may be particularly preferably designed in the form of elastic connecting pieces for connecting through-channels of the partial pieces. Due to connecting pieces of this type, for example in the form of short hoses made of an elastic material or corrugated bellows, sections of through-channels of the partial body may be through-connected fluid-tight. By elastically pretensioning (compressing) the connecting pieces, an application of force onto seals of the rotating body may be achieved, for example against an end face on the housing side.

Alternatively, the axial, elastic tolerance compensation may be carried out by a permanently elastic molded part between the consecutively disposed partial bodies or by elastically pretensioned dealing elements on the end faces of the rotating body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 11 shows a spatial view of a switching member of another specific embodiment of a rotating valve;

FIG. 12 shows a partially sectional view of a rotating valve having a switching member according to FIG. 11;

FIG. 26 shows a developed view of a rotating valve from FIG. 25 in a first position;

FIG. 27 shows the rotating valve from FIG. 26 in a second position;

FIG. 28 shows a detailed representation of a longitudinal section of the rotating valve from FIGS. 26 and 27;

FIG. 29 shows a view of a section along line XXIX-XXIX in FIG. 28;

FIG. 30 shows a view of a section along line XXX-XXX in FIG. 28;

DETAILED DESCRIPTION

Figure 1:
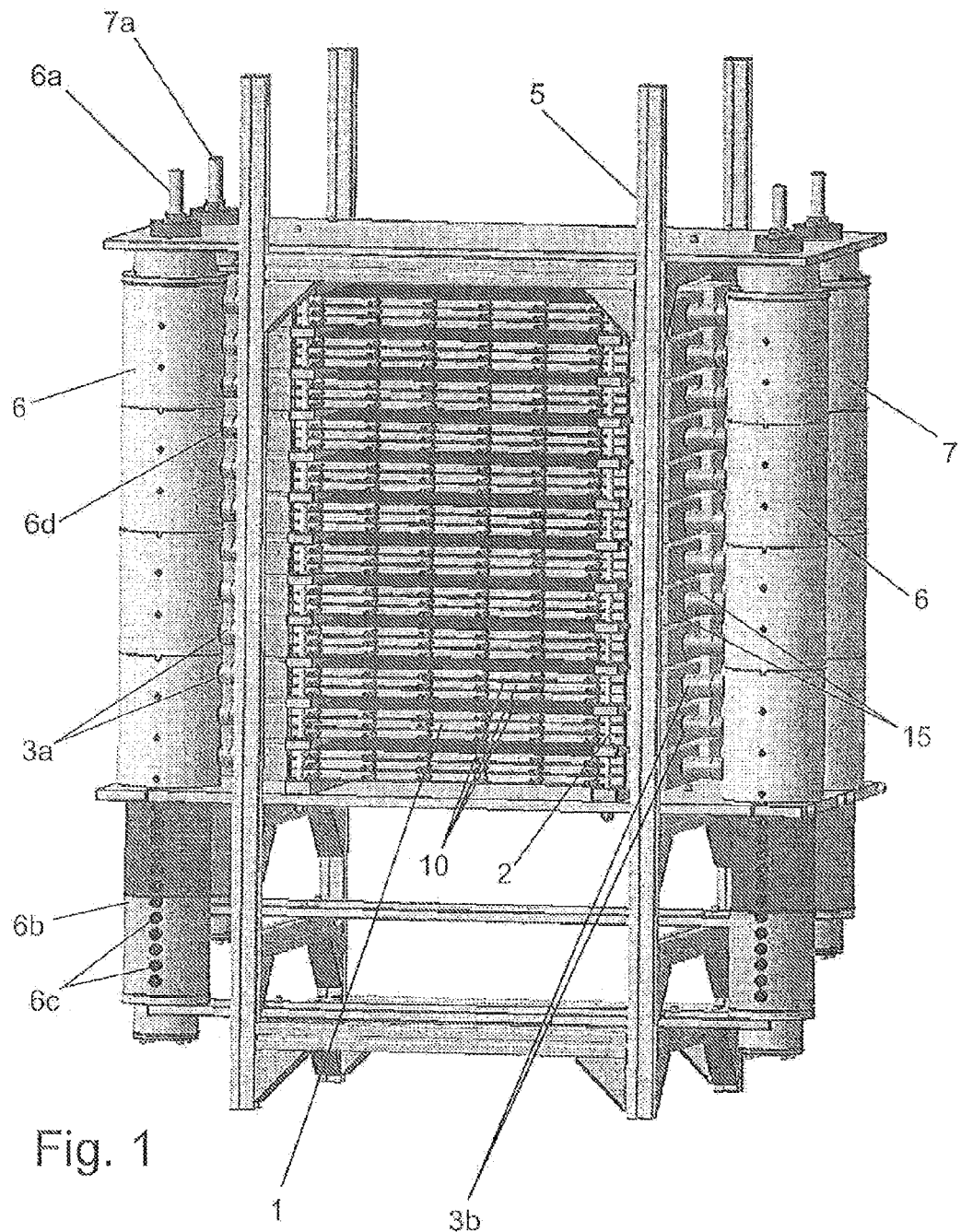
FIG. 1 shows a spatial overall view of a heat pump according to an embodiment of the invention.

FIG. 1 shows a heat pump in which a plurality of, in the present case, twelve hollow elements 1 are disposed parallel to each other in the manner of a stack. The stack of hollow elements 1 is detachably connected via tension members 2 to form a structural unit.

Each of hollow elements 1 has a first zone A in the form of an adsorption/desorption zone and a second zone B in the form of an evaporation/condensation zone. First zone A is penetrated by a first flow channel 3 of a circulating first fluid which is transported by a pump (not illustrated) for each of hollow elements 1, and second zone B is penetrated by a second flow channel 4 of a second fluid, which in the present example is different from the first fluid, but does not necessarily have to be so, for each of hollow elements 1. Each of flow channels 3, 4 has end-face connections 3a, 3b which are diametrically opposed to each other and which each serve as inlets or outlets for the fluid flowing through flow channels 3, 4.

The stack of hollow elements 1 held together by tension members 2 is disposed in a mounting frame 5 of the heat pump. A total of four rotating valves are disposed on the outside of mounting frame 5 and connected to the stack of hollow elements 1, two largely structurally equivalent rotating valves 6 being connected to inlets and outlets 3a, 3b of sorption side A. Two rotating valves 7, which generally have a design deviating therefrom, in particular with regard to the number of flow channels separated in the valve, but which are structurally identical to each other, are connected to the second zone, i.e., evaporation/condensation side B, of hollow elements 1.

Figure 2:
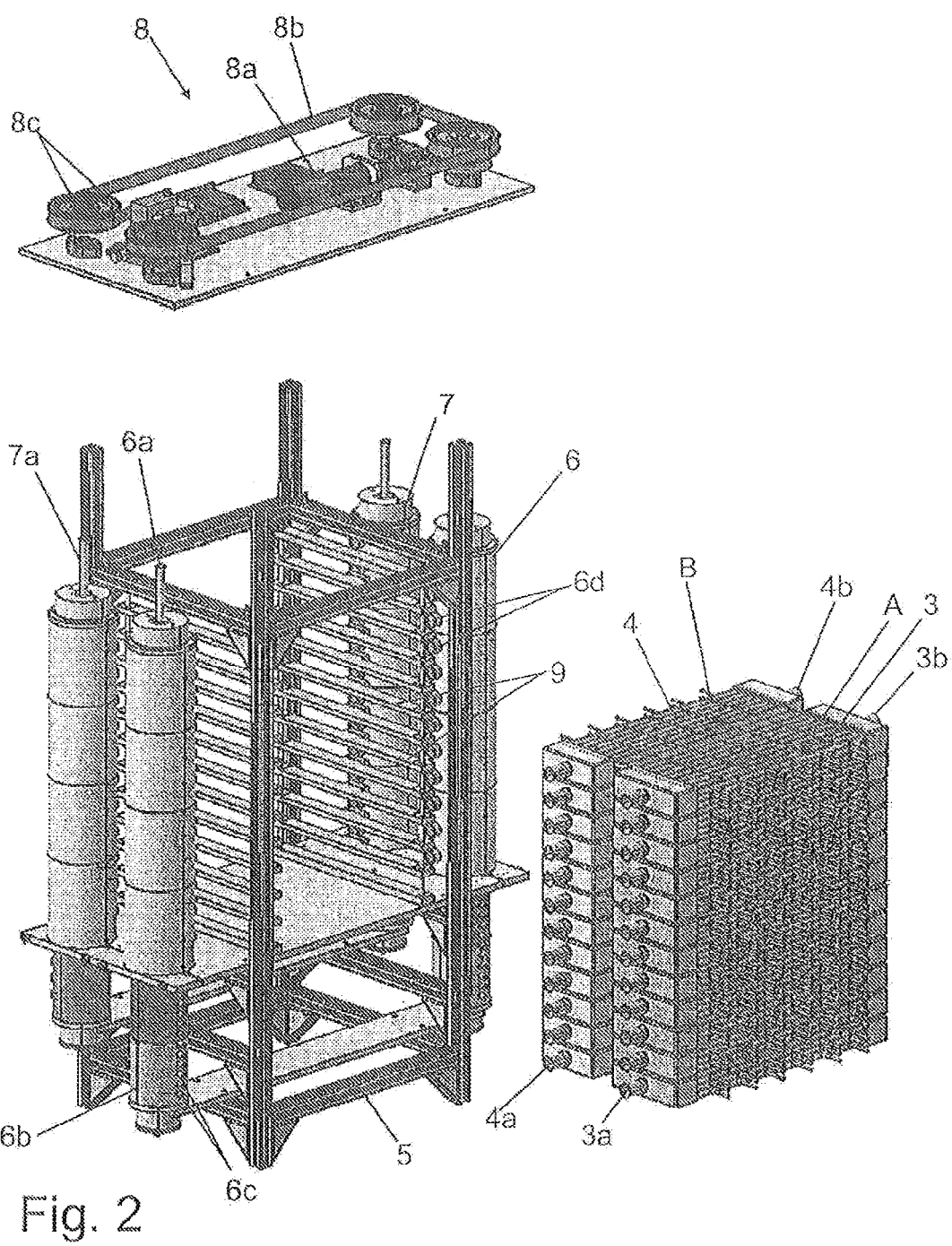
FIG. 2 shows an exploded view of the heat pump from FIG. 1.

Rotating valves 6, 7 are all oriented parallel to each other, central rotary shafts 6a, 7a of rotating valves 6, 7 being connected to a modular-type drive unit 8 which is illustrated schematically in FIG. 2. Drive unit 8 includes an electric motor 8a, via which four driving wheels 8c for driving particular axes 7a, 6a of rotating valves 6, 7, are moved synchronously via a cam belt 8b. In the present construction, all rotating valves 6, 7 are driven at the same angular velocity.

Rotating valve 6 of sorption side A of hollow elements 1 have an inlet region 6b, which includes twelve separate inlets 6c, so that each of twelve hollow elements 1 corresponds to one separate channel within rotating valve 6. Rotating valves 7 of evaporation side B have a smaller number of only four separate inlets 7c in an inlet region 7b, since such a strictly differentiated separation of the flow channels is usually not necessary on this side of the heat pump compared to the sorption side. Likewise, multiples of hollow elements 1 are each simultaneously connected to one of the flow channels in valves 7 with regard to their second zone B. Reference is made in this regard to the explanations according to the prior art in WO 2007/068481 A1.

Adjacent hollow elements 1 are held at a distance from each other, which is achieved, in the present case, by suitable spacers 9 between the hollow elements. An air gap thus remains between hollow elements 1, so that these elements are effectively thermally insulated from each other. To further improve the thermal insulation, insulating plates 43 (see FIG. 6) made, for example, of foamed polymer or fibrous insulating materials may be inserted.

Individual connections 3a, 3b, 4a, 4b of hollow elements 1 are connected to corresponding connections 6d, 7d of rotating valves 6, 7, which extend in a row oriented radially from the walls of an outlet region of the essentially cylindrically shaped rotating valves. To compensate thermally induced expansions of the heat pump, connections 7d, 6d of rotating valves 6, 7 are connected to connections 3a, 3b, 4a, 4b of the stack of hollow elements 1 via elastic connecting pieces, for example hose pieces or corrugated bellows.

Figure 4:
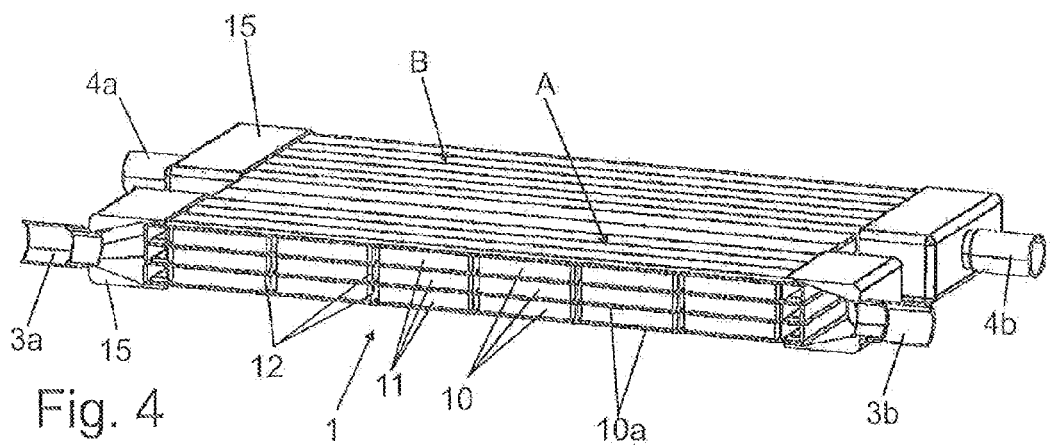
FIG. 4 shows a spatial sectional view of a hollow element of the heat pump from FIG. 1.
Figure 5:
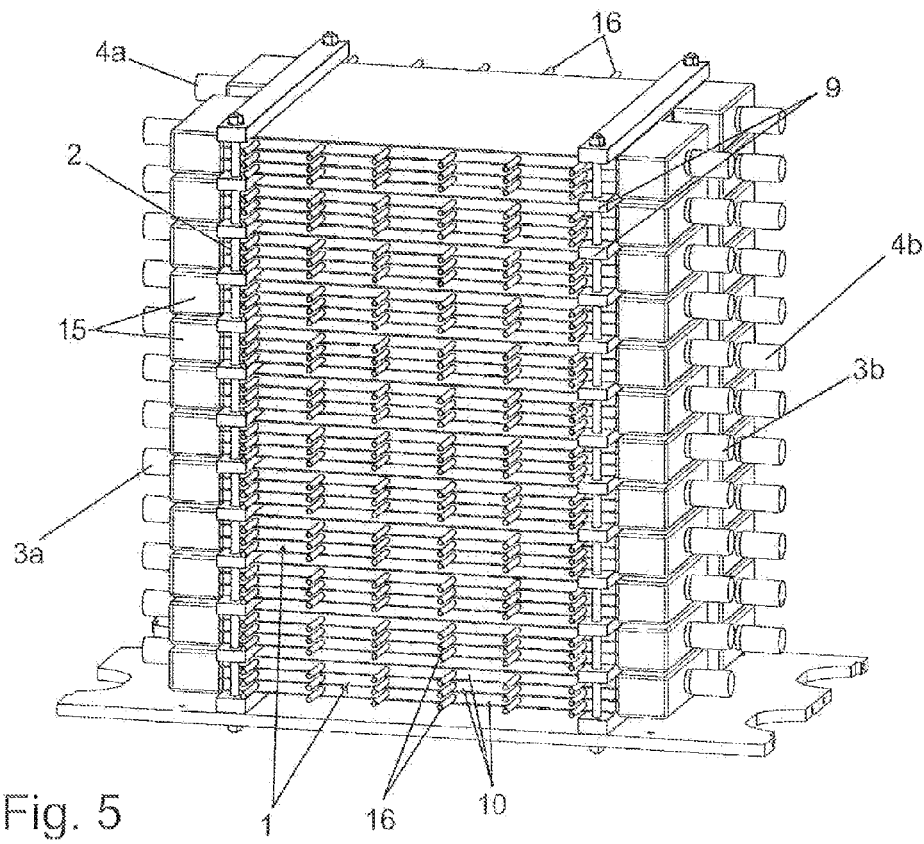
FIG. 5 shows a spatial view of a stack of hollow elements of the heat pump from FIG. 1.
Figure 6:
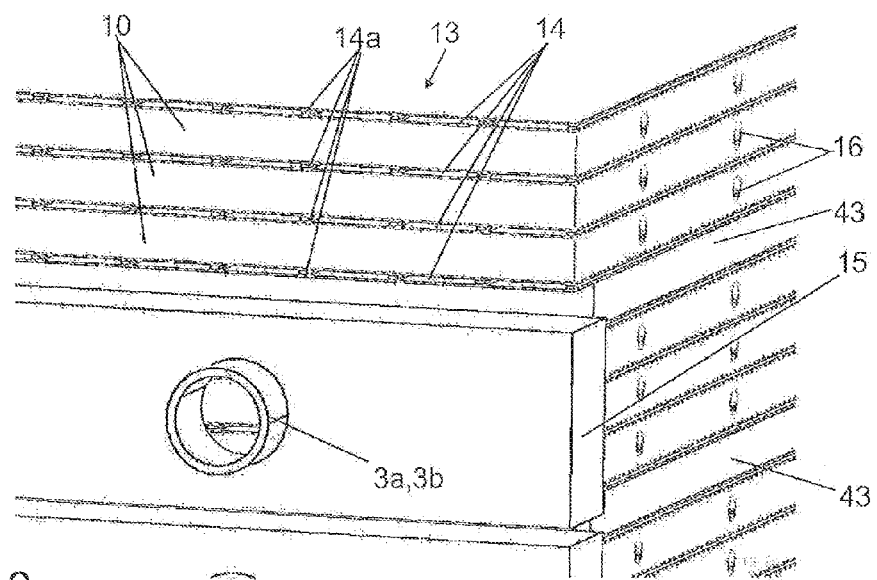
FIG. 6 shows an enlargement of a section of a schematic, partially cutaway spatial view of the stack from FIG. 5.

As shown, in particular, in FIG. 4 through FIG. 6, individual hollow elements 1 are each designed as a stack of subelements 10, around which the fluid flows, in order to optimize the heat exchanges with the fluid. Each of subelements 10 is designed as a flat, plate-shaped element by disposing multiple adsorber elements 11 next to each other in the direction of fluid flow and by separating them from each other in a substance-tight manner via webs 12 which are perpendicular in relation to the direction of fluid flow. Adsorber elements 11 are disposed primarily in the region of first zone A (see illustration according to FIG. 4), evaporation/condensation structures are provided in zone B and are also separated from each other by webs 12. These structures, which are not illustrated, may include capillary structures which may maintain a sufficient quantity of a working medium in the liquid phase. In the present exemplary embodiment, adsorber elements 11 are made of activated carbon, the working medium being methanol. Depending on the temperature range and target application of the heat pump, any combination of adsorption material, working medium and embodiment of evaporation region is conceivable. In principle, a heat pump according to the invention is not limited to the adsorption/desorption principle, but any suitable thermodynamically active hollow elements 1 may be provided, for example chemisorptive hollow elements.

Each of subelements 10 is designed as a plate element which is closed in a substance-tight manner with the aid of cover plates 10a. These closed elements 10 are stacked at a distance from each other via small spacers 14a (see FIG. 6) and held a distance apart from outer closing plates 13 of the hollow elements. Four flat through-flow paths 14 for the fluid are thus located in each of hollow elements 1, which in the present case each form a stack of three subelements 10. Through-flow paths 14 are further divided by spacers 14a, which extend continuously in the direction of fluid flow. To further reduce the number of components, spacers 14a may also be indentations in cover plates 10a and/or closing plates 13.

Through-flow paths 14 may furthermore be equipped with surface enlarging structures, such as ribs, which are not illustrated.

In the connecting regions at the ends of hollow elements 1 for the fluid, connecting pieces 15 are provided which distribute the fluid to the multiple through-flow regions 14 between subelements 10 in the manner of collector boxes or scoops.

A filling tube 16 (see FIG. 5), via which the individual chambers may be evacuated and filled with working medium, extends from the side of each of the chambers which are hermetically sealed by cover plates 10a and webs 12. After filling, filling tubes 18 are permanently closed, for example, by crimping. To simplify the filling operation, a filling tube 16 is disposed on each of the opposite end faces of a hermetically sealed chamber, so that working medium may flow through the chambers in the longitudinal direction thereof, i.e., perpendicularly to the direction of fluid flow. During the course of the filling operation, a vacuum may thus be applied on one side, and the working medium may be supplied via the corresponding filling tube on the opposite side.

On the whole, this modular structure of the heat pump, which is made of separate hollow elements 1 including subelements 10, not only improves the thermal efficiency by thermally insulating the separate hollow elements, but it also provides a maintenance-friendly construction in which only one defective hollow element, and not the entire stack of hollow elements, must be replaced.

Figure 3:
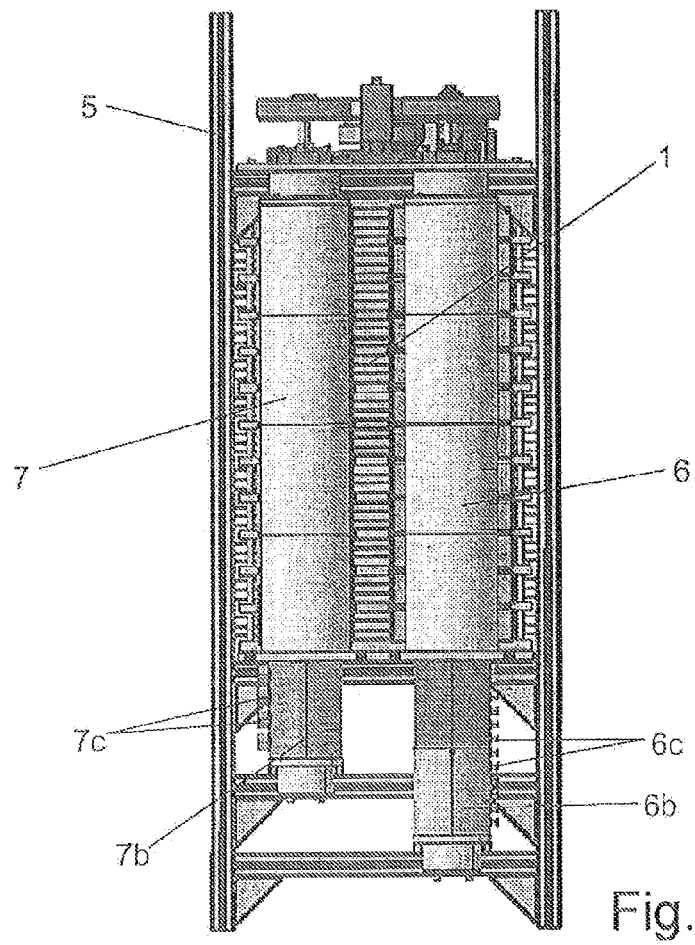
FIG. 3 shows a top view of the heat pump from FIG. 1, seen from the side.

Rotating valves 6, 7 illustrated schematically in the views of the heat pump according to FIG. 1 through FIG. 3 correspond to the prior art in terms of their design, in that the alternating interconnection of the different flow channels takes place via radially oriented partition walls in connection with annular chambers adjacent thereto in double-walled cylinders. In connection with the openings in the cylinder walls, the partition walls form a switching region of the rotating valve.

Figure 7:
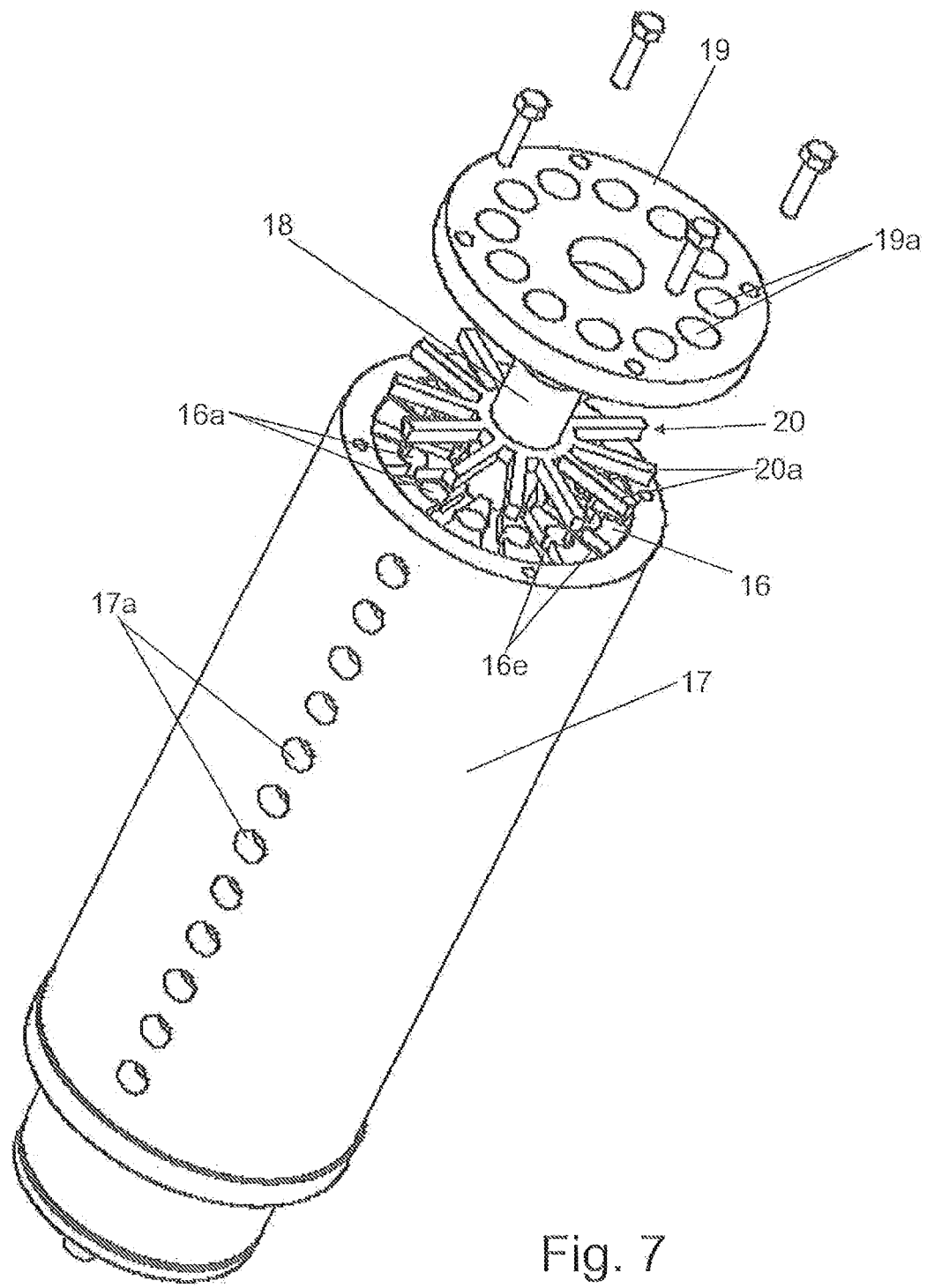
FIG. 7 shows a spatial exploded representation of a first exemplary embodiment of a rotating valve according to the invention.

FIG. 7 shows a refinement according to the invention of a rotating valve of this type, which may be directly combined with the above-described heat pump in a particularly preferred embodiment and which has advantages, among other things with regard to a smaller size, easier manufacturability and better sealing of the separate channels.

A rotationally driven switching member 16 is disposed in an only single-walled hollow cylinder 17, which has equidistant connecting openings 17a which are disposed in a straight row for connection to connections 3a, 3b of the stack of hollow elements 1. Switching member 16 is shown separately in FIG. 8. It is an element which is designed as a largely cylindrical longitudinal body which is rotatable around a central shaft or axis 18. Switching member 16 has a number of axial, parallel bores 16a in its circumferential direction, the number of which is twelve in the present case and which number corresponds to the number of hollow elements or separate, alternatingly interconnected flow channels. A series of circumferential radial projections 16b, which are ring-shaped in the present case, are provided over the length of switching member 16 designed as a cylindrical longitudinal body. Projections 16b are provided in pairs so that an annular seal, which is not illustrated, is held between a pair of projections in a form-locked manner. On the whole, sealing members are provided hereby for forming equidistant annular chambers 16c which are separated from each other fluid-tight via the sealing rings. Each of annular chambers 16c has a bore 16d, which is oriented radially with regard to the fluid flow and which empties into one of axial channels 16a. Radial bores 16d are offset from one another accordingly in the circumferential direction, so that they form a circumferential spiral having pitch 1. On the whole, each of channel bores 16a, which empties at the end face in the axial direction, is thus radially connected to precisely one annular chamber 16c. Each of annular chambers 16c lines up with one of connecting openings 17a to the stack of hollow elements 1 and is sealed fluid-tight against the other annular chambers.

As shown in FIG. 7, the end-face axial openings of channels 16a pass over corresponding axially oriented opening bores 19a of a control disk 19, which is mounted on and closes the end face of the rotating valve and is connected in a stationary manner to outer cylinder 17 to form a tight seal.

During a rotation of switching member 16, individual axial channels 16a thus alternately line up with different stationary, axially oriented inlet openings 19a in control disk 19 in the manner of axial openings that are carried along. In this specific embodiment, control disk 19 forms an inlet region in the sense of the invention and is simultaneously part of the switching region of the rotating valve.

To reduce or even entirely avoid an unwanted exchange of fluid between adjacent channels in the region of this switching transition from openings 19a to openings 16a, a star-shaped sealing element 20 is inserted between control disk 19 and the end face of switching member 16. Star-shaped fingers 20a of sealing element 20 engage with radial grooves 16a on the end face of switching member 16.

A system of connecting hoses (not illustrated) is connected to inlet openings 19a in control disk 19 and leads, at the other end, to other openings 19a or to an external heat exchanger, according to the basic concept of the heat pump. To connect to external heat exchangers or heat sources, reference is generally made to the prior art in WO 2007/068481 A1.

Figure 8:
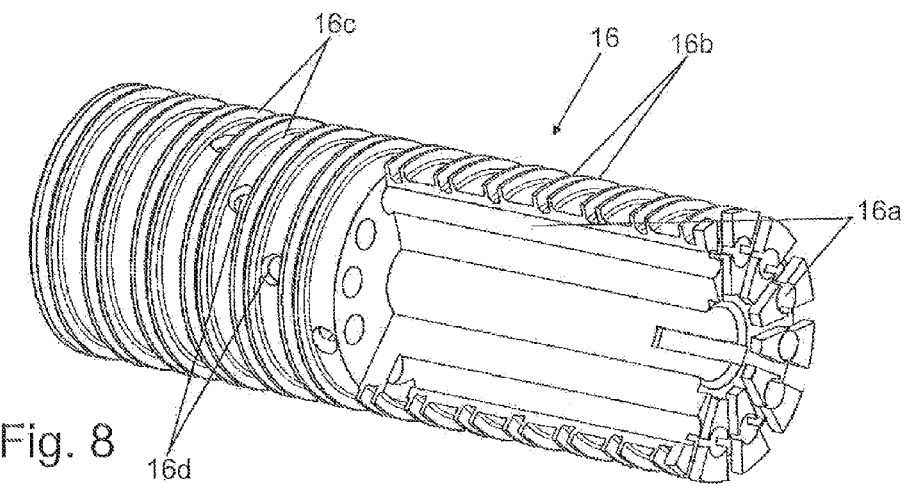
FIG. 8 shows a rotational switching member of the rotating valve from FIG. 7 in a spatial, partially cutaway view.
Figure 9:
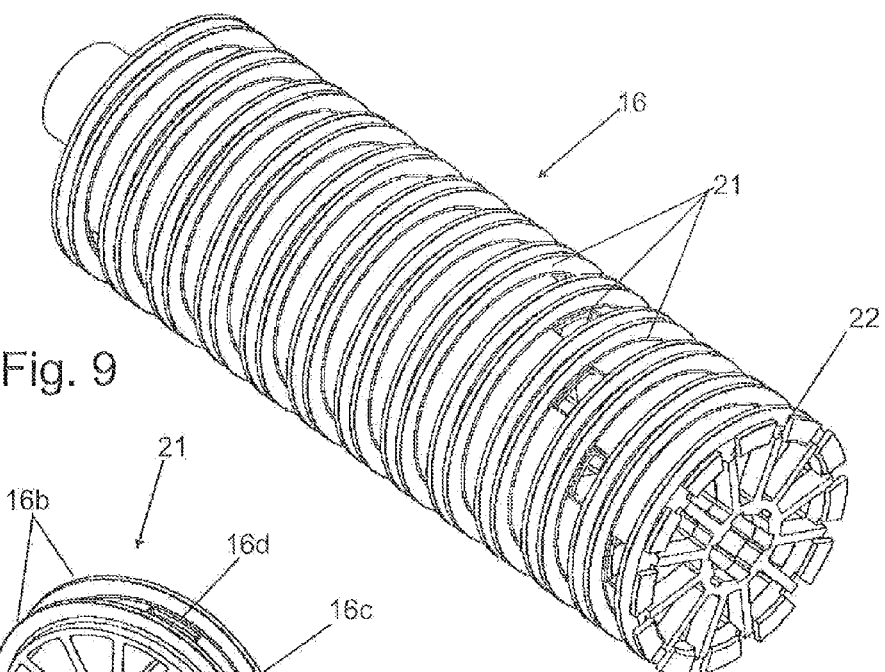
FIG. 9 shows a modification of the switching member from FIG. 8 in a multipart design.
Figure 10:
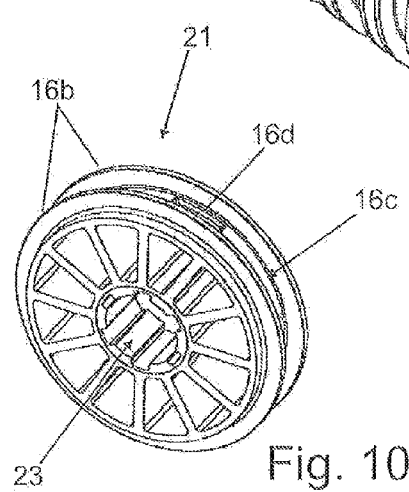
FIG. 10 shows a longitudinal body element of the switching member from FIG. 9 designed as a longitudinal body.

FIG. 9 shows a modification of switching member 16 which has an identical function to the switching member in FIG. 8. Switching member 16 is designed as a stack of longitudinal body elements 21 (see FIG. 10) as well as an end piece 22 of a different design. At least some of longitudinal body members 21 are structurally identical and are constructed to be rotated toward one another by a fractional angle according to the number of channels. To further simplify a structure of this type, a form-locked receptacle 23 is provided in longitudinal body elements 21 for form-locked connection to a central drive shaft, receptacles 23 having a symmetry that corresponds to the number of channels. In the present case, receptacle 23 has a rotational symmetry that is divided into six parts, so that two longitudinal body elements 21 which are different with regard to the positioning of radial opening 16d relative to receptacle 23 are alternately used to construct the entire stack of twelve longitudinal body elements.

A variant in which the shaft and receptacle have a symmetry divided into 12 parts is not illustrated, in this case only one type of longitudinal element being needed.

In the present case, rotating valves 6, 7 are made of a sufficiently heat-resistant plastic, the stack of hollow elements 1 being largely constructed of metal sheets with regard to its walls and connections. The use of postreticulated thermoplastics is recommended, in particular, as the plastic for constructing rotating valves 6, 7.

Due to the construction of switching member 16 described above, it is possible to alternate the interconnection of the flow channels by means of covering with regard to the openings oriented axially in relation to the fluid flow, which substantially shortens the installation length and reduces and simplifies the number and shape of the components. In particular, it is possible to eliminate a double-walled cylinder having annular chambers provided between the stationary cylinder walls in the region of the connections to the stack of hollow elements, as in the prior art.

FIG. 11 through FIG. 18 show embodiments and modifications of a rotating valve which include a switching member 24 having radial partition walls. The channels separated by radially extending partition walls 25 are moved via an inner cylinder having bores 26 that are offset in the circumferential direction (see FIG. 16), so that the channels consecutively cover different openings 26 during the course of the movement of partition walls 25. Each of bores 26 empties into an annular chamber 29 provided between stationary inner cylinder 27 and a stationary outer cylinder 28. Connections 30 which are disposed equidistantly in a straight row are provided in outer cylinder 28 for connection to the stack of hollow elements 1. In a specific embodiment of this type, the switching operation for alternating interconnection of the flow channels is carried out by partition walls 25 passing over openings 26 which are oriented radially in relation to the fluid flow.

A series of improvements according to the invention over the prior art are explained below for such a specific embodiment of a rotating valve.

FIG. 11 shows a configuration of switching member 24 of a rotating valve of this type, which has an inlet region 31 whose design is similar to that of switching member 16 from FIG. 8, but in this case does not perform the function of a switching member, since no change in the assignments of the flow channels takes place in the inlet region. Inlet region 31 and switching member 24 are connected to each other as non-rotationally connected, separate components via shaft 18, which engages with both components in the manner of a tension member, with the aid of a safety bolt 32.

Figure 13:
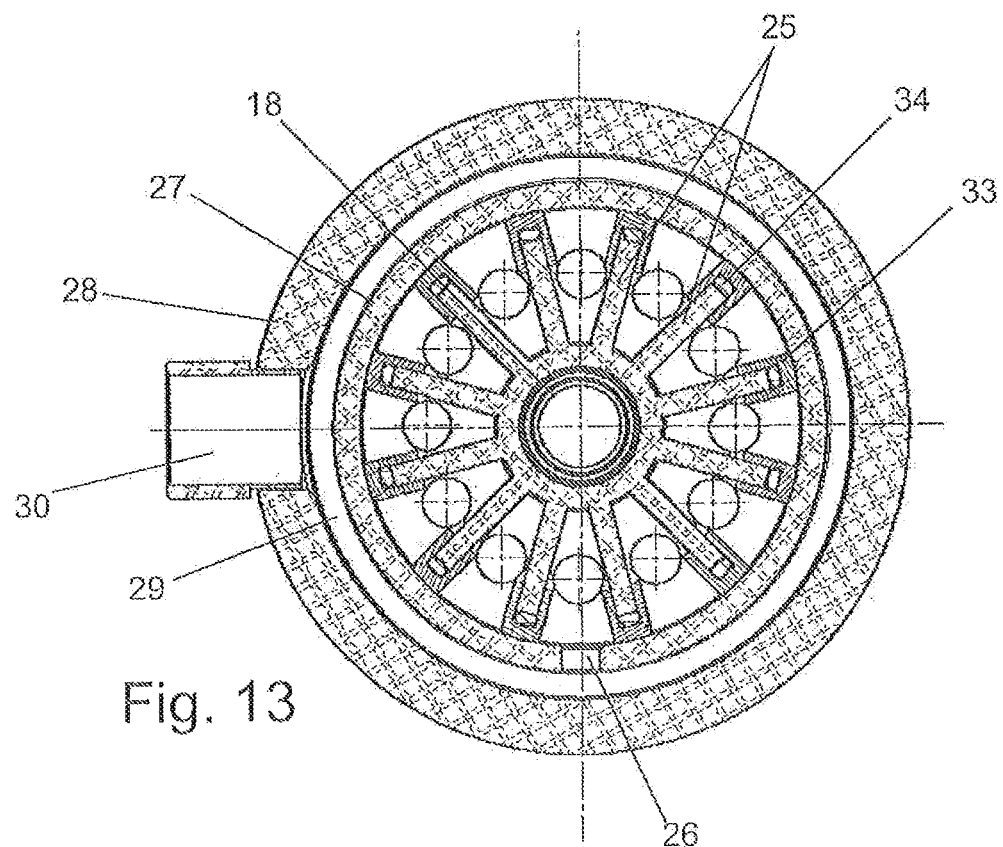
FIG. 13 shows a sectional view of the rotating valve from FIG. 12 perpendicular to a rotation axis of the switching member.

Star-shaped, radially extending partition walls 25 advantageously have sealing component 33 disposed resiliently in their radial end regions in the manner of axially extending sealing strips. FIG. 13 shows an exemplary embodiment in which sealing strips 33 have a U-shaped cross section, an additional resilient element 34 being inserted between the end face of partition wall 25 and sealing component 33. The individual axial channels are particularly effectively sealed against each other hereby.

Figure 14:
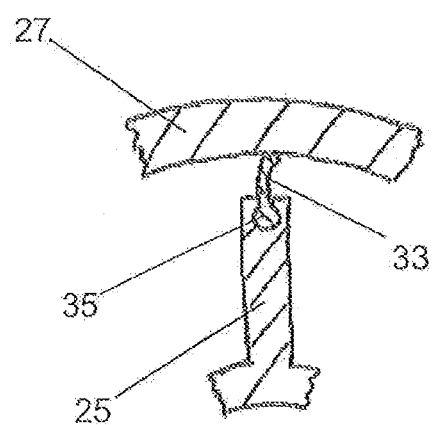
FIG. 14 shows a partially sectional view of a modification of the rotating valve from FIG. 13.
Figures 15, 16:
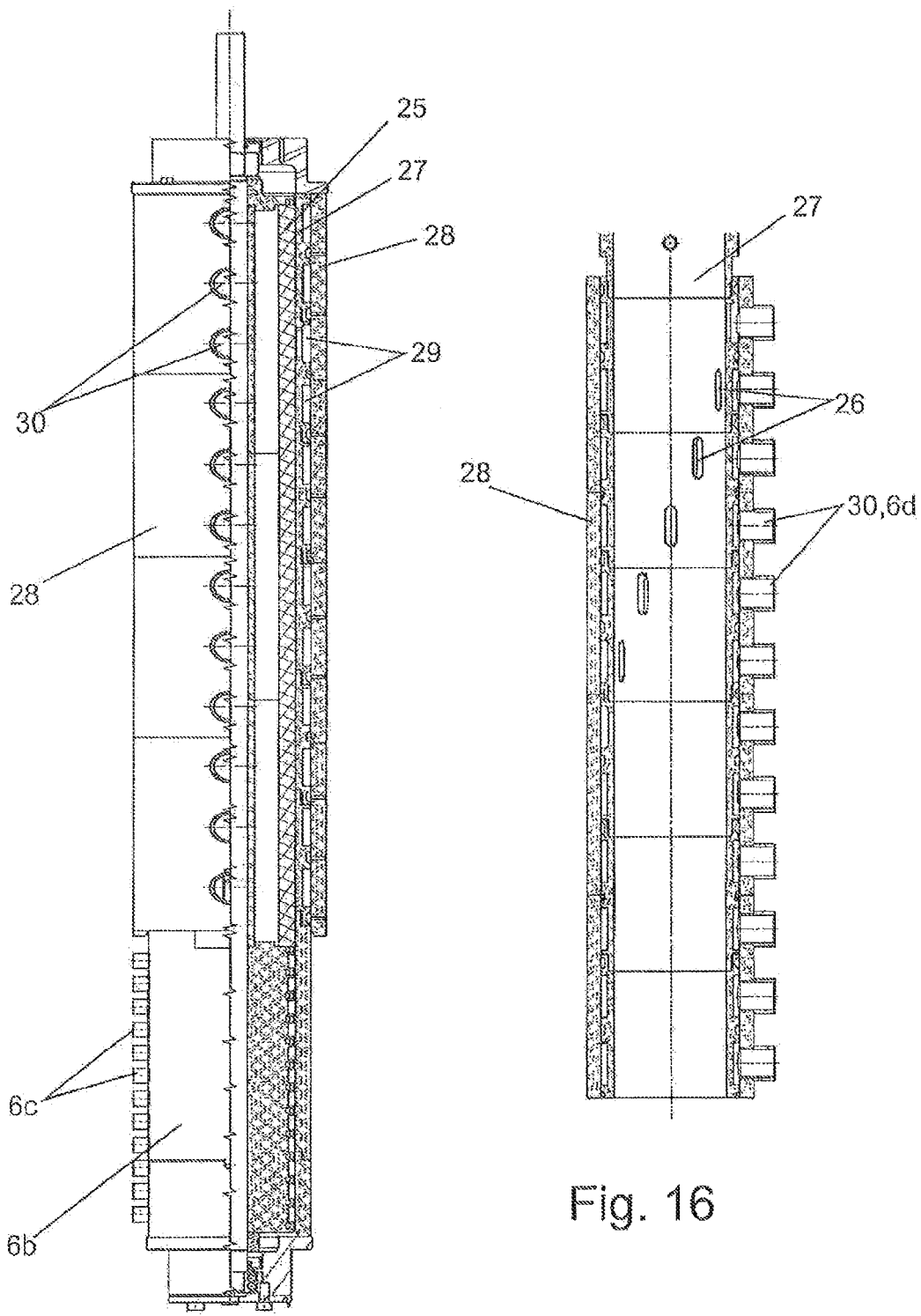
FIG. 15 shows a partially cutaway overall view of the rotating valve from FIG. 12.
FIG. 16 shows another partially cutaway view of the rotating valve from FIG. 12 and FIG. 15.

A modification of a sealing strip of this type in the radial end regions of partition walls 25 is illustrated in FIG. 14. Seal 33 is designed in the manner of a sealing lip which passes over the inner wall and which is inserted in a form-locked manner into a corresponding end-face groove of partition wall 25 via a bead-like thickening 35.

FIG. 12 shows another advantageous refinement, in which central shaft 18 of switching member 24 is mounted, at least at one end of the rotating valve, in a bearing bush 36 which also has a rotating seal 37. Rotating seal 37 additionally seals any fluid leakages against the outer area.

Figure 17:
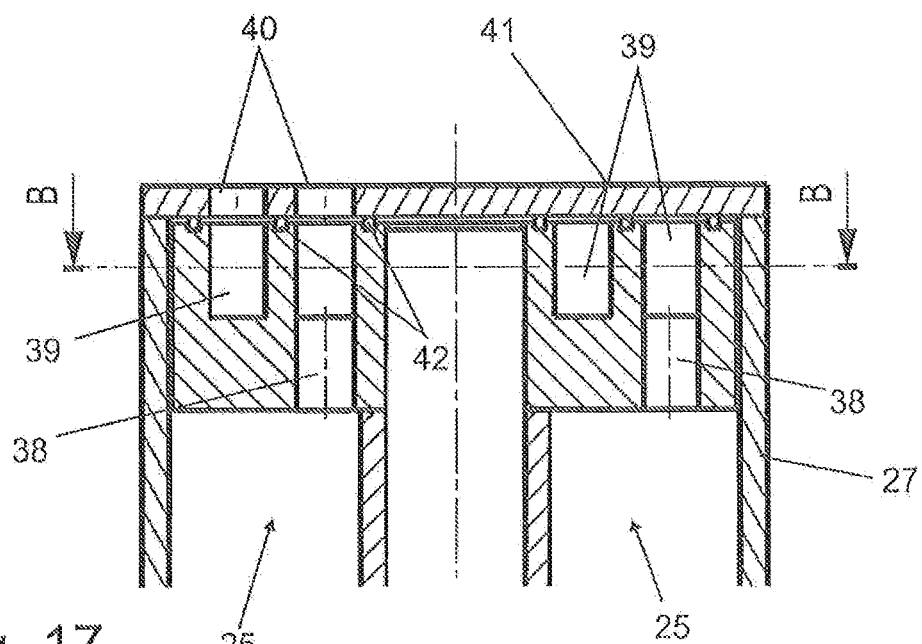
FIG. 17 shows a sectional view of another exemplary embodiment of a rotating valve running parallel to a rotation axis.
Figure 18:
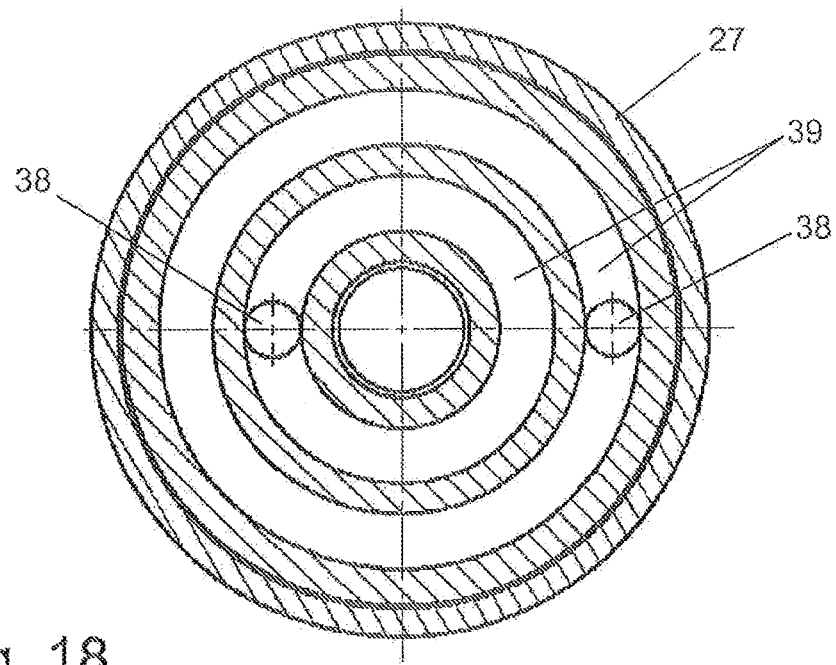
FIG. 18 shows a sectional view of the rotating valve from FIG. 17 along line B-B.

Another exemplary embodiment of a rotating valve according to the invention is illustrated in FIG. 17 and FIG. 18. In this valve, the flow paths are again interconnected with the aid of radially oriented partition walls 25 and radially oriented openings in the wall of an inner cylinder 27 which empty into annular chambers of an outer cylinder, which is not shown.

In contrast to the embodiment, for example, according to FIG. 11, the inlet region of the fluid flows to the axial chambers divided by partition walls 25 is provided with a simple and compact design in the embodiment according to FIG. 17 and FIG. 18. This is achieved by connecting each of the axially longitudinally oriented chambers of the switching member, which are separated by partition walls 25, to a different concentric, annular groove 39 via a bore 38, each of annular grooves 39 being located on the same plane as the other annular grooves 39 but having a different diameter. In the present exemplary embodiment according to FIG. 17 and FIG. 18, only two annular grooves 39 for corresponding, alternating switching of only two flow paths are illustrated. More than two concentric, annular grooves may also be provided, whereby a particularly large number of flow paths, for example twelve flow paths as in the exemplary embodiments described above, generally results in an increasingly more complex structure. However, a rotating valve of this type is very suitably used, for example, for interconnecting the evaporation/condensation region of a heat pump explained above, since only a few, for example two or four, separate flow channels usually need to be interconnected therein.

Annular grooves 39 of the switching member are connected to outer inlets of the fluid flows via bores 40 in an inlet plate 41 which is connected in a stationary manner to the cylinder. Each of bores 40 empties into one of annular grooves 39, so that, according to illustration 17, each of openings 40 in inlet plate 41 is connected to precisely one of the axial chambers of switching member formed by axial partition walls 25, independently of the rotational position of the switching member. To ensure a fluid-tight separation of the annular grooves, O ring seals 42 are provided between inlet plate 41 and the walls of annular grooves 39.

In the interest of clarity, the outer cylinder, including its annular chambers surrounding inner cylinder 27, is not illustrated in the drawings in FIG. 17 and FIG. 18.

Figure 19:
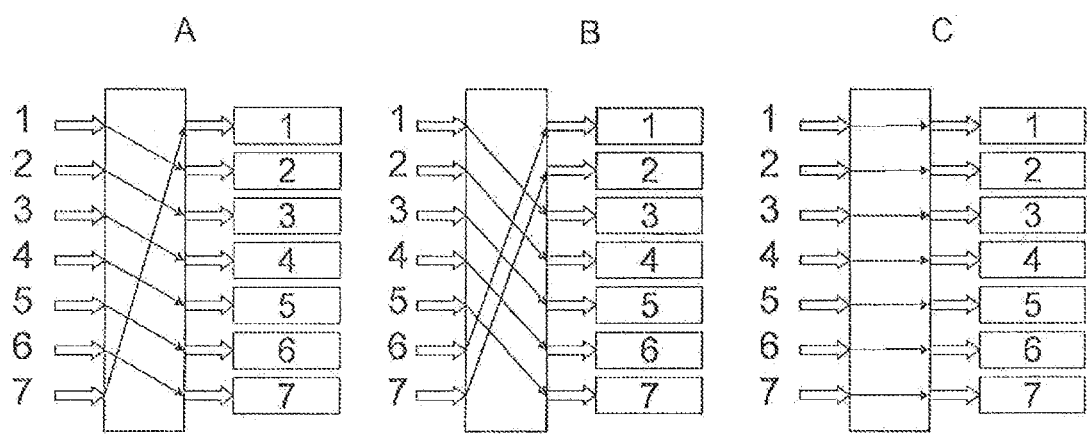
FIG. 19 shows a schematic representation of the switching operations of a rotating valve according to the invention in the case of seven flow channels.
Figure 20:
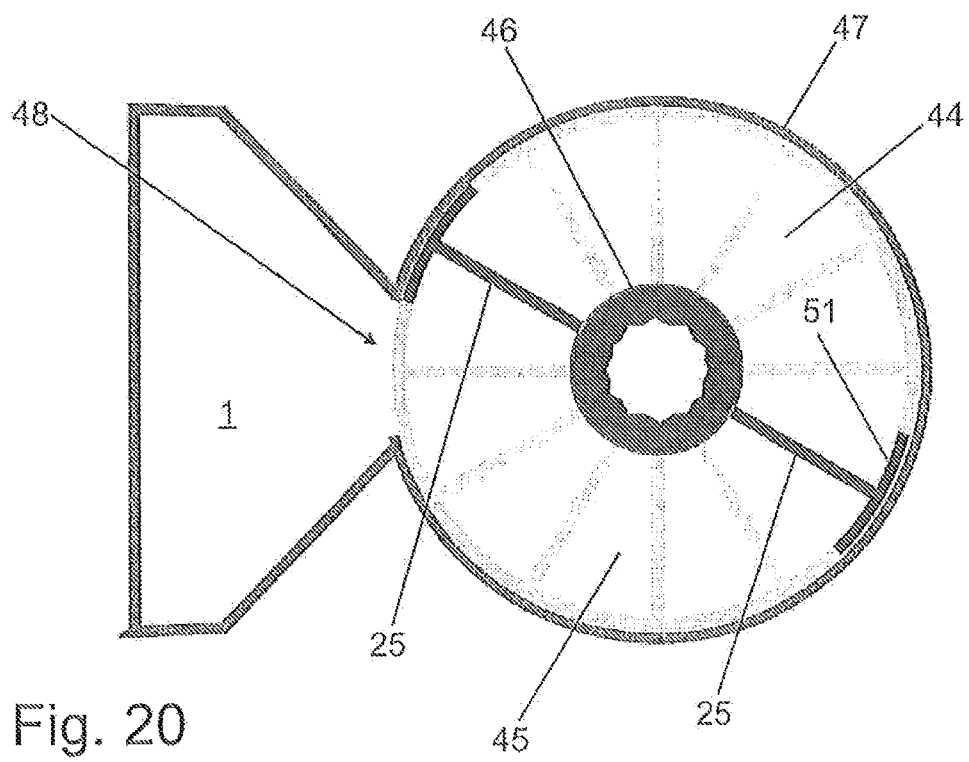
FIG. 20 shows a schematic sectional view of another exemplary embodiment of a rotating valve in a first valve position.
Figure 21:
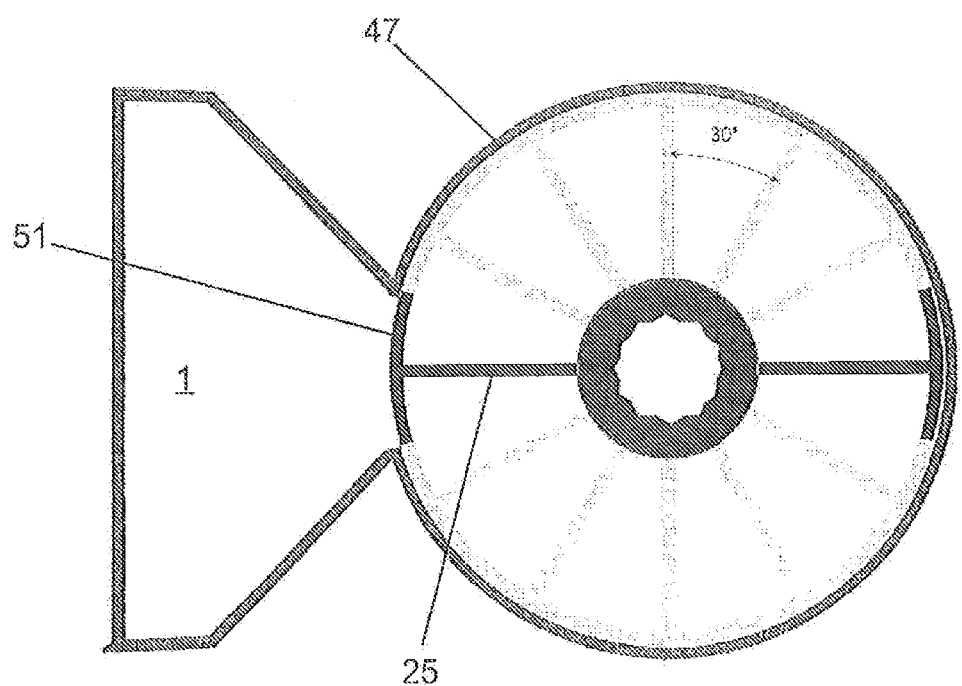
FIG. 21 shows the valve from FIG. 20 in a second valve position.
Figure 22:
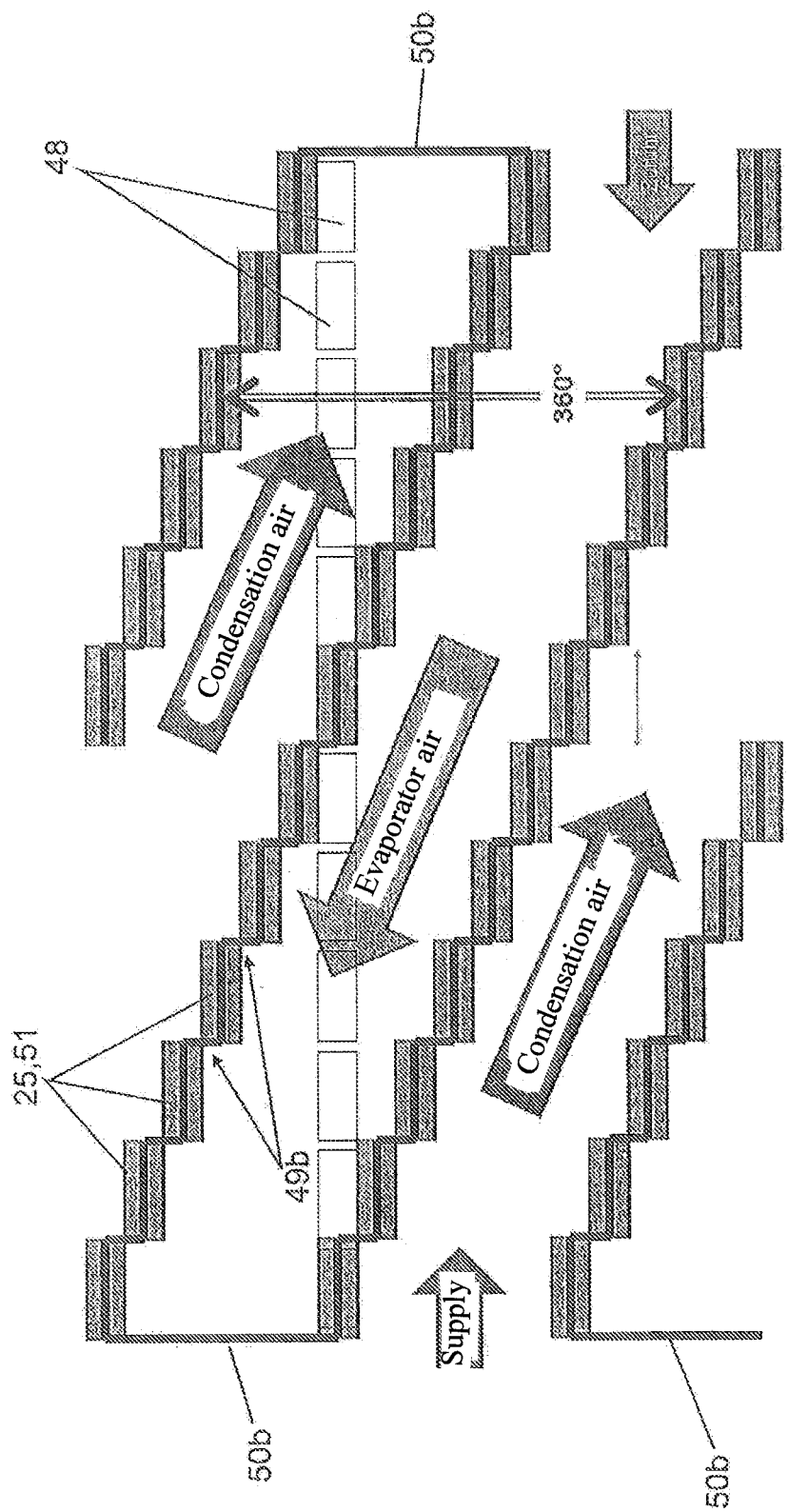
FIG. 22 shows a schematic representation of an uncoiling of the rotating valve from FIG. 20, the uncoiling taking place over a total of 540 degrees.

FIG. 19 shows a schematic representation of the switching function of a rotating valve having seven alternately switched flow paths or fluid flows. Three switching positions A, B, C are shown, position C returning to position A after a further step. Fluid flows 1 through 7 are numbered on the input side, and hollow elements 1 through 7 are numbered on the output side. The original interconnection is again reached after seven changes of the assignment or one full rotation of the rotating valve.

The exemplary embodiment of a rotating valve 7 according to the invention and illustrated in FIGS. 20 through 24 for combination with a heat pump according to the invention has only two chambers or flow channels 44, 45 and is particularly suitable for combining with air as a second fluid for exchanging heat with second zones B of hollow elements 1.

Rotating valve 7 in this exemplary embodiment has only a single-walled outer cylinder 47, which has radial openings 48 disposed in a straight row for connection to hollow elements 1. A rotatable switching member 24 accommodated in cylinder 47 includes a hub or shaft 46 from which two partition walls 25 extend radially to the cylinder wall. In contrast to the exemplary embodiment according to FIG. 11, partition walls 25 are not designed to be straight in the axial direction or continuously coiled as is known from the prior art in WO 2007/068481 A1. Instead partition walls are coiled in steps, which is illustrated, in particular, in the uncoiled representations according to FIG. 22.

Figure 23:
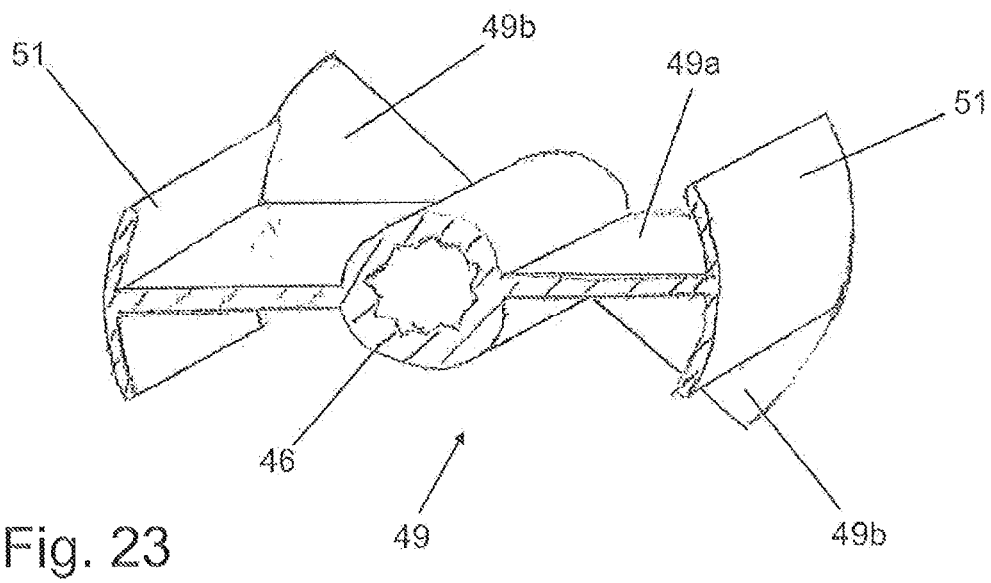
FIG. 23 shows a spatial freehand sketch of a switching member component of the rotating valve from FIG. 20 forming a center part.
Figure 24:
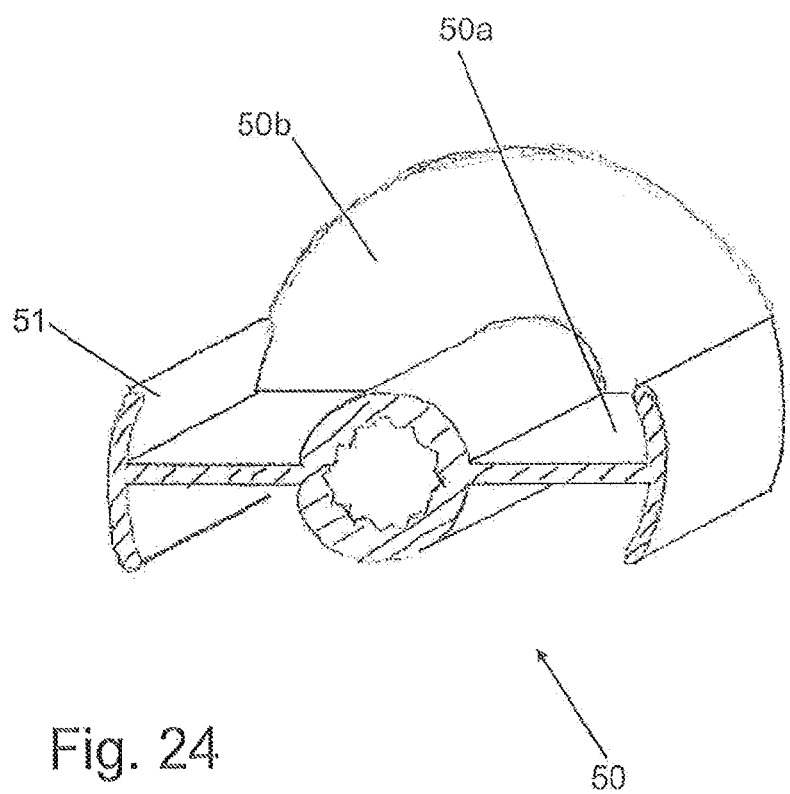
FIG. 24 shows a spatial freehand sketch of an end-face switching member component of the rotating valve from FIG. 20.

The stepped coiling of partition walls 25 of switching member 24 permits a simple structure of multiple switching member parts 49, 50 which are disposed consecutively in the axial direction. FIG. 23 shows a switching member part 49 which is provided in the middle region as a repetition of equivalent parts which are offset from each other by a certain number of degrees. Switching member parts 49 have flat partition wall sections 49a which extend parallel to the rotation axis in the radial direction as well as covering sectors 49b which extend perpendicularly to the rotation axis, adjoin partition wall segments 49a and, in the present example, have a 30 degree opening angle by means of which the stepped, coiled chambers or flow channels 44, 45 of switching member 24 as a whole may be provided.

Switching member parts 50 forming closing pieces disposed on the ends have an individual covering sector 50b which has an opening angle of 180 degrees, these 180-degree closing sectors being disposed inversely from each other on the opposite ends of switching member 24. This easily provides an outer inlet and an outer outlet to chambers 44, 45, since the fluid (air in the present case) is supplied only at the one end face of outer cylinder 47 and may be removed at the opposite end (see developed representation according to FIG. 22). Depending on the present operating state of the hollow elements of second zone B, the supplied air may be referred to as evaporation air or as condensation air.

Another preferred detail of the rotating valve, which is not necessary for the basic principle, includes a covering tab 51 which is provided at the ends of partition wall segments 25, 49 in the radial direction and which follows the curvature of cylinder 47. The opening angle of covering tab 51 is approximately the same size as the opening angle of openings 48 in the cylinder wall, so that, in one position (see illustration in FIG. 21), individual or, in a corresponding design, multiple hollow elements 1 are closed in relation to second zone B. During operation, this represents an adiabatic intermediate step of the interconnections of the flow paths, which enables the effectiveness of the heat pump to be further improved.

In the present example, twelve hollow elements 1 are provided, so that a total of twelve switching member parts 49, 50, which are rotated by 30 degrees in relation to each other, are combined to form a switching member 24. However, deviating stages in a given number of hollow elements are conceivable without substantially influencing the function of the rotating valve.

Figure 25:
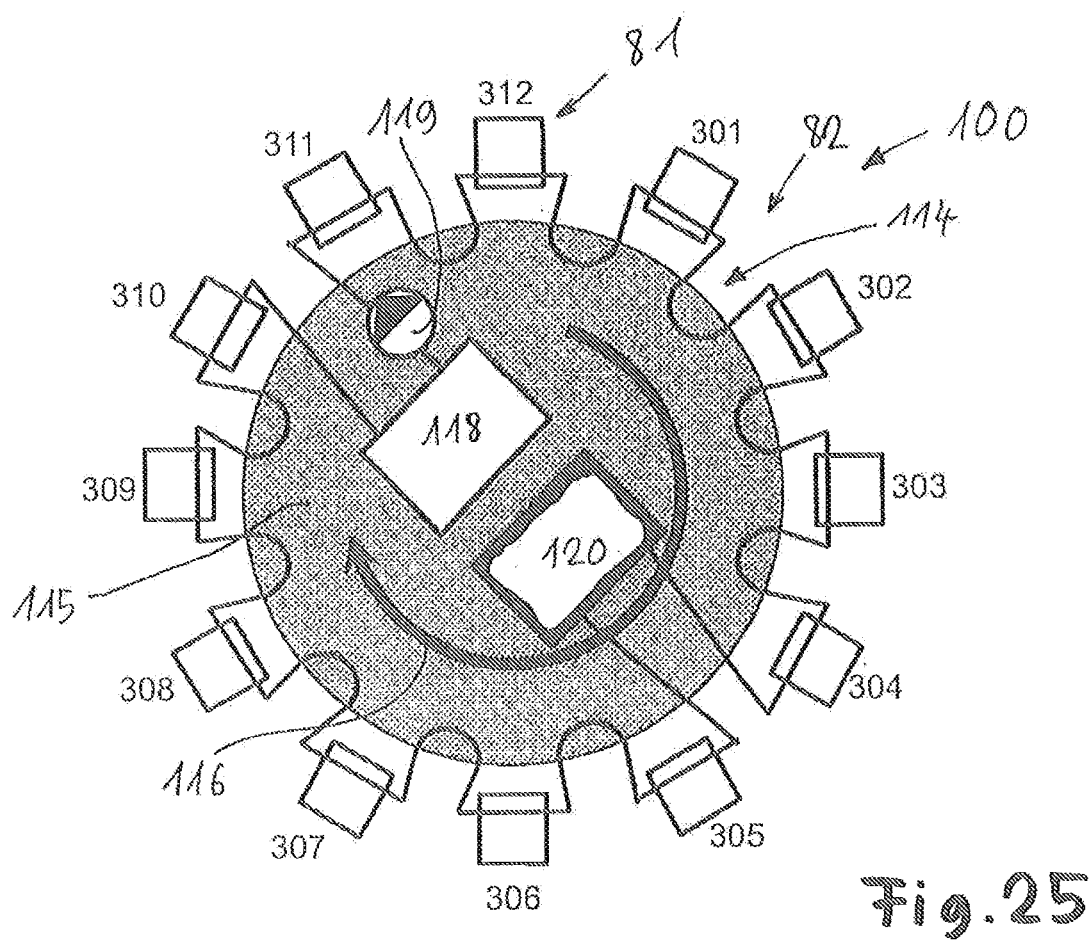
FIG. 25 shows a simplified representation of the switching function of a rotating valve according to a further exemplary embodiment.

The switching function of a rotating valve 100 according to a further exemplary embodiment is illustrated in FIG. 25 as a two-dimensional diagram. Rotating valve 100 includes a plurality of inlets 101 through 112 as well as outlets 201 through 212, which may be individually assigned to inlets 101 through 112 via connecting lines 126 or 128 and 129. The inlets and outlets are connected, for example, to thermally active modules 301 through 312.

Rotating valve 100 includes a switching member 114 which, in turn, includes a rotating body 115 which is rotatable, as indicated by an arrow 116. A first heat exchanger in the form of a cooler 118, to which a pump 119 is connected downstream, is shown in rotating body 115. A second heat exchanger is designed as a heater 120.

Rotating valve 100 illustrated in FIG. 25 is used to control the flow of a heat transfer fluid through twelve thermally active modules, as described above on the basis of the exemplary embodiments in FIGS. 1 through 24. A heat transfer fluid may flow through twelve thermally active modules 301 through 312 in series with the aid of rotating valves 100 illustrated in FIG. 25. The heat source, in particular heater 120, and the heat sink, in particular recooler 118, are connected between each of two modules. Rotating valve 100 has the function of shifting the location of the intermediate connection of heater 120 and recooler 118 in steps without these components having to also rotate, as would be required in a direct implementation of the schematic circuit. Deviating from the representation in FIG. 25, cooler 118, pump 119 and heater 120 are therefore disposed in a stationary manner outside rotating valve 100 in the following figures of an exemplary structural implementation.

FIGS. 26 and 27 first show rotating valve 100 from FIG. 25 in a schematic developed view. Rotating valve 100 includes twelve inlets 101 through 112, which are also referred to as inputs and are combined into an inlet region 81. Similarly, rotating valve 100 includes twelve outlets 201 through 212, which are also referred to as outputs and are combined into an outlet region 82. Inlets 101 through 112 may be connected in different ways to outlets 201 through 212 via switching member 114, which includes rotating body 115, when rotating body 115 rotates in the direction of arrow 116. In FIGS. 26 and 27, cooler 118 and heater 120 are disposed outside a housing 125.

An opening in an end face of housing 125, which essentially has the shape of a hollow circular cylinder, is assigned to each inlet 101 through 112 and each outlet 201 through 212. The inlets and outlets empty into the ends of housing 125. An opening in rotating body 115 may be assigned to each opening in housing 125. Due to these assignments, each of inlets 101 through 112 may be connected in a defined manner to associated outlets 201 through 212. In the exemplary embodiment illustrated in FIG. 26, inlets 102 through 106 and 108 through 112 are each connected to associated outlets 202 through 206 and 208 through 212 via one through-channel 126. Through-channels 126 extend in a straight line through rotating body 115.

Inlets 101 and 107 are each connected to associated outlet 201, 207 via interrupted connecting channels 128, 129. Connecting channels 128, 129 are divided into subchannels 128a, 128b and 129a, 129b, respectively, with the aid of partition walls or the like in such a way that they force a deflection of the flow via cooler 118 and heater 120, respectively. Four annular chambers 131 through 134, which are illustrated as straight channels in the developed view in FIGS. 26 and 27, are provided for this purpose within housing 125. Inlet 101 is connected to annular chamber 133 via interrupted connecting channel 129, which, in turn, is connected to heater 120.

Heater 120 is connected to outlet 201 via annular chamber 134. Similarly, inlet 107 is connected to cooler 118 via annular chamber 131, and the cooler, in turn, is connected to outlet 207 via annular chamber 132 and interrupted connecting channel 128. Due to the rotation of rotating body 115 in the direction of arrow 116, through-channels 126 and interrupted connecting channels 128, 129 are assigned to other inlets and outlets. This shift preferably takes place in steps in such a way that rotating body 115 always comes to a stop when the discharge openings of channels 126, 128, 129 provided in rotating body 115 cover the corresponding openings in housing 125.

In FIG. 27, rotating body 114 is rotated by one step compared to the representation in FIG. 26. In FIG. 27, an inlet 102 is connected to associated outlet 202 via heater 120. Similarly, inlet 108 is connected to associated outlet 208 via cooler 118. Remaining inlets 101, 103 through 107, 109 through 112 are connected directly to associated outlets 201, 203 through 207, 209 through 212 via through-channels 126.

Rotating valve 100 illustrated in simplified form in FIGS. 26 and 27 is shown in greater detail in FIGS. 28 through 30. In cylindrical housing 125, which is cut away lengthwise in the illustration, rotating body 115 is rotatably driven with the aid of a supported drive shaft 150 which is and sealed to the surroundings. Two ceramic sealing plates 151, 152 are provided at each end face of housing 125 for axial support of rotating body 115. Ceramic sealing plate 151 is fixedly assigned to housing 125. Ceramic sealing plate 152 is assigned to rotating body 115 and rotates therewith relative to ceramic sealing plate 151 and housing 125. The two pairs of plates may be elastically pretensioned against each other via a spring device (not illustrated).

Four annular chambers or annular spaces 131 through 134 are each connected to associated connecting channel 128, 129 via radial openings 141 through 144. Radial openings 141 through 144 represent a radial, through-window which establishes a fluid connection between annular chambers 131 through 134 and axial connecting channels 128, 129 disposed radially therein, which are divided into two subchannels 128a and 128b and 129a and 229b, respectively, by at least one partition wall 128c and 129c, respectively. The assignments between subchannels 128a, 128b and 129a, 129b, respectively, and annular chambers 131 through 134 are preferably selected in such a way that two adjacent annular chambers 131, 132 and 133, 134 are connected to corresponding, i.e., lined up, inlets 101; 107 and outlets 201; 207. As a result, one fluid path is always routed through heater 120, and another of the total of twelve existing fluid channels is routed through the cooler or recooler 118, depending on the position or rotation of rotating body 115.

In FIG. 28, the fluid passes from inlet 101 to heater 120 via radial opening 143 and annular chamber 133, as indicated by an arrow 121. A further arrow 122 indicates that the fluid passes from heater 120 to outlet 201 via annular chamber 134 and radial opening 144. Similarly, the fluid passes from inlet 107 to cooler 118 via radial opening 141 and annular chamber 131, as indicated by an arrow 123. A further arrow 124 indicates that the fluid passes from cooler 118 to outlet 207 via annular chamber 132 and radial opening 142.

FIG. 28 shows that the rotor axis is supported in the cylindrical housing with the aid of bearings 155, 158, and the entire inner volume is sealed to the surroundings by a sealing element 154. In addition, apart from the two preferably ceramic area seal pairs 151, 52, only two additional sealing elements 157, 158, 159 are needed to seal the four annular chambers 131 through 134 against each other in the axial direction.

FIGS. 29 and 30 show two sectional views of rotating valve 100 from FIG. 28. In FIG. 29, arrows 161 and 162 indicate how the fluid passes from heater 120 to radial opening 144. In FIG. 30, additional arrows 163 and 164 indicate how the fluid passes from cooler 118 to radial opening 142. In addition, the sectional views show rotating bodies 115, which are divided into twelve axial chambers and which form a stack of preferably form-locked injection-molded plastic parts on a common shaft 150. Reference numerals 128 and 129 identify the through-channels which are each divided into two subchannels 128a, 128b and 129a,129b, respectively, with the aid of partition walls 128c and 129c.

Figure 31:
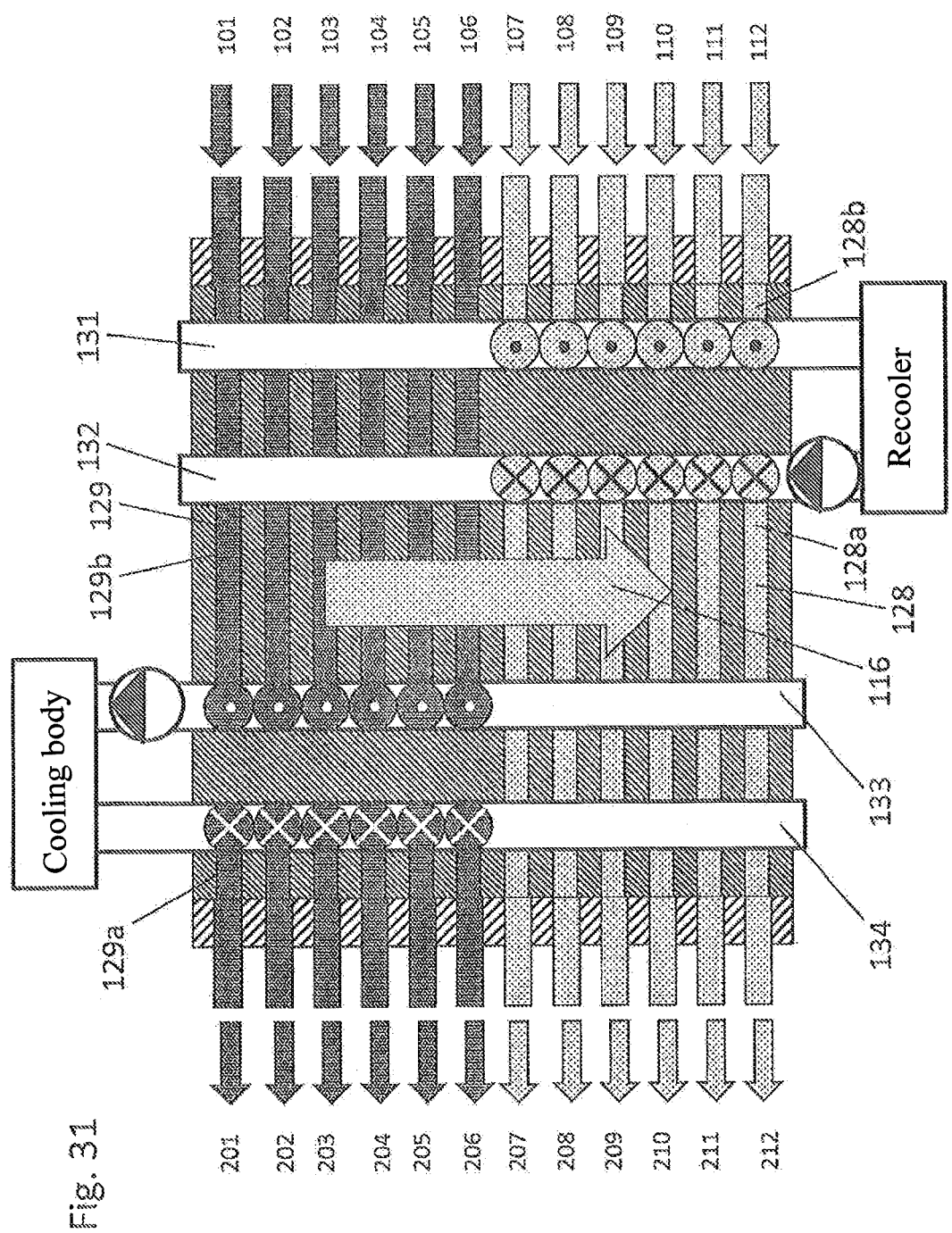
FIG. 31 shows a developed view of a modified specific embodiment of the rotating valve from FIG. 26 in a first position.
Figure 32:
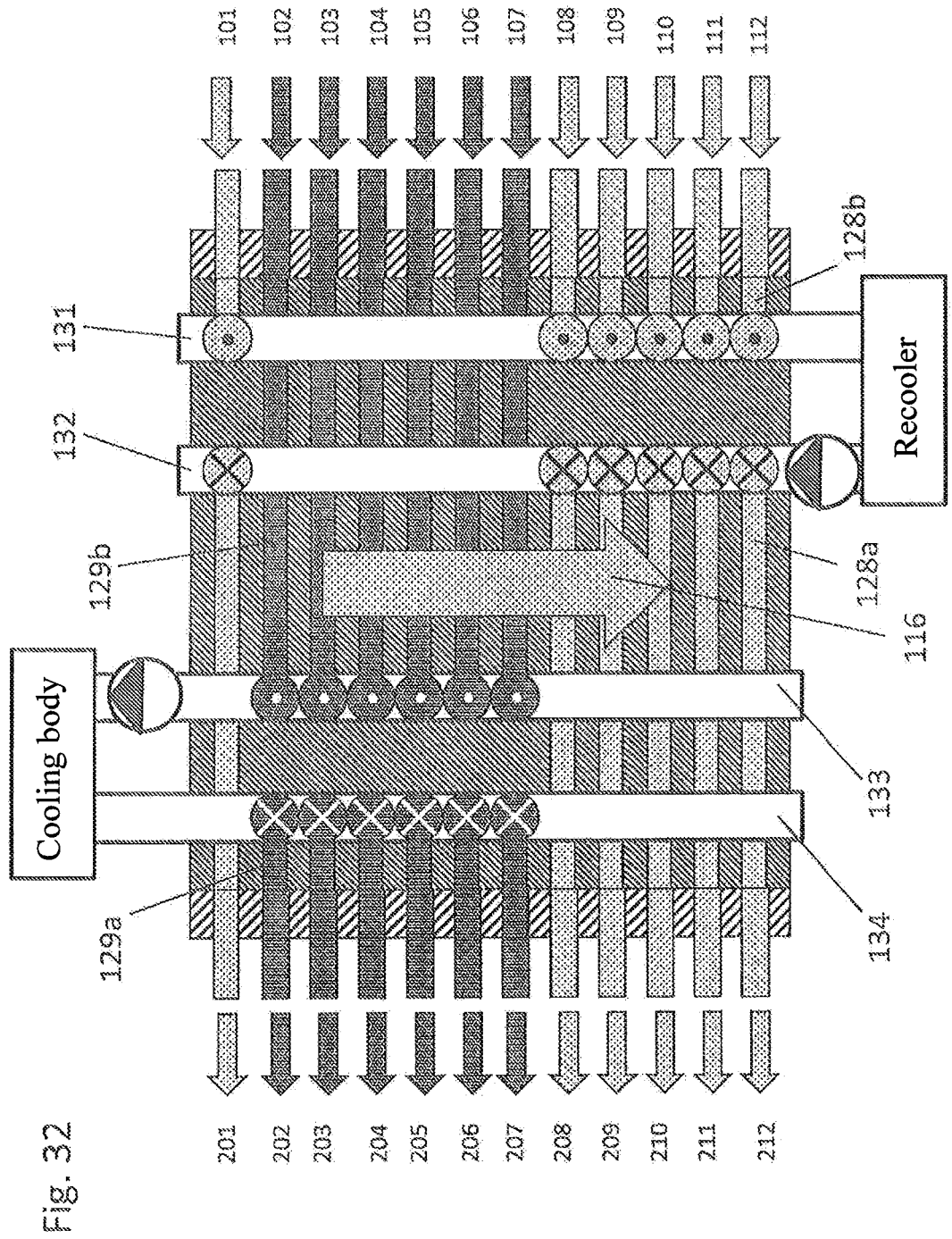
FIG. 32 shows the rotating valve from FIG. 31 in a second position.

The use of a slightly modified valve, whose developed views are shown in two positions in FIGS. 31 and 32, is advantageous for controlling the fluid circulations of the evaporation/condensation zones.

As shown in FIG. 31, rotating body 115 has only interrupted through channels according to reference numerals 128 and 129, each of which is divided into subchannels 128a, 128b and 129a, 129b, respectively, by partition walls 128c and 129c, and which have radial through-windows to annular chambers 131 through 134, which, in turn, are connected in pairs to two heat transfer units, which are identified as "cooling body" and "recooler." In the illustrated specific embodiment, no more purely through-channels exist of the category corresponding to reference number 126.

FIG. 32 shows the rotating valve in the following position.

This modified specific embodiment permits thermally active modules 301 through 312 to be assigned to at least two separated fluid circulations which are driven by their own transport devices, within which the flow passes through the assigned modules in parallel, depending on the switching position of the rotating valve.

Due to the parallel guidance of two groups of through-channels 128 and 129 in rotating body 115, multiple radial through-windows are needed which establish a flow connection in one common annular chamber of the total of four annular chambers needed. The partition walls within a group of through-channels may preferably be eliminated in the rotating body, whereby a large radial through-window is then needed for each annular chamber, which is not illustrated in greater detail here.

The two specific embodiments according to FIGS. 26, 27 and 31, 32, respectively, represent only two examples of the division of the through-channels according to categories 126, 128 and 129. Other divisions of the through-channels into these categories are, of course, possible and also practical for special applications.

In particular, individual through-channels may also be entirely closed in order to force adiabatic processes therein. This is preferably achieved by closing the radial openings in channels 128a, 128b, 129a and 129b in FIG. 31.

Rotating valve 100 has the following advantages, among others: high integration of switching functions replaces two conventional rotating valves; reduced drive and control complexity; compact, material-conserving design; easy, cost-effective manufacturing, for example from injection-molded plastic parts; easily implemented, low-wearing area seals using ceramic disks or ceramic plates 151, 152; short flow paths with low heat exchange between the individual flow paths; low friction and required driving torque; low bypass losses.

FIGS. 33 through 37 show another specific embodiment of a rotating valve 100, which represents a modification of the rotating valve according to FIG. 25 through FIG. 29. Where possible, the reference numerals of the example according to FIGS. 25 through 29 are used.

Figure 33:
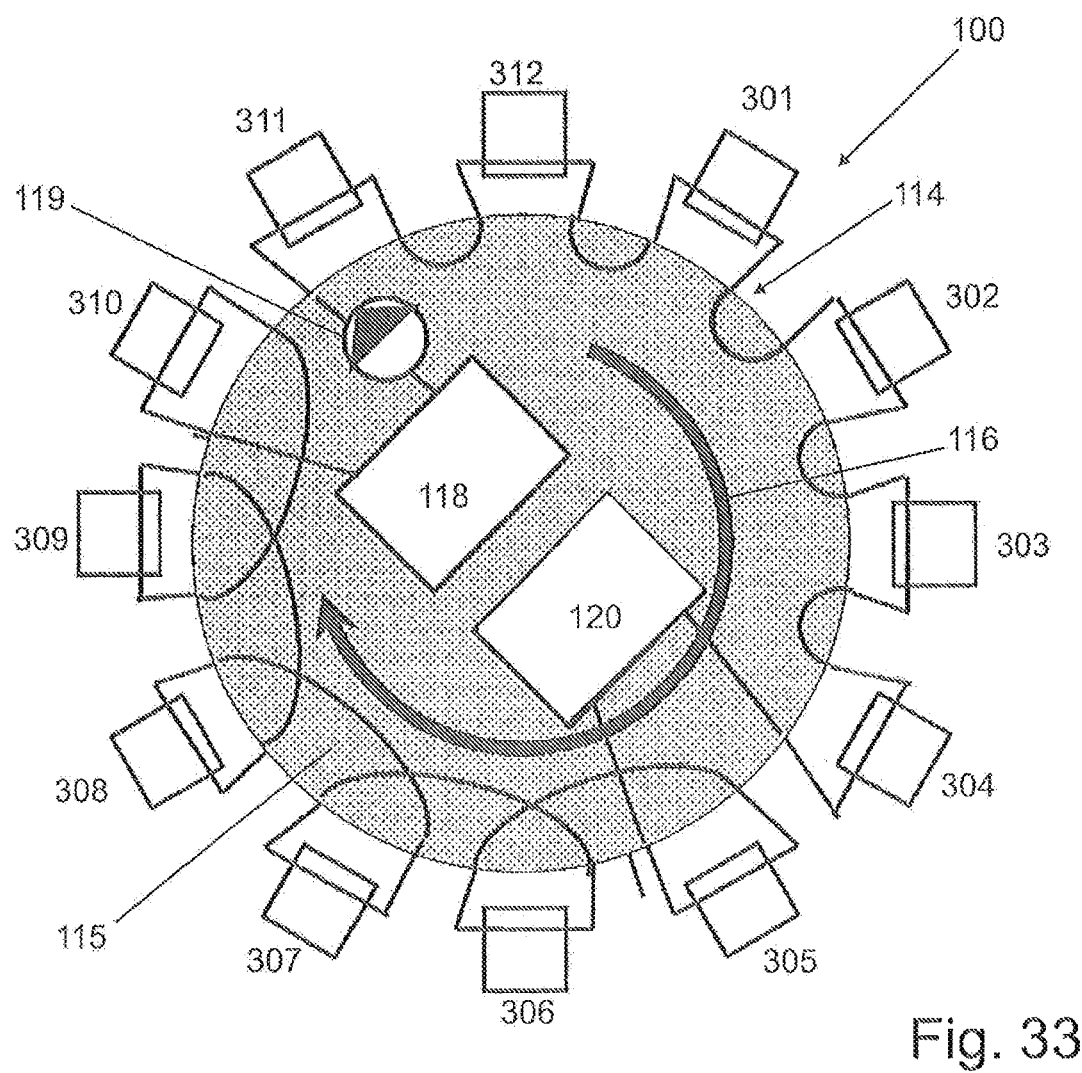
FIG. 33 shows a further specific embodiment of a rotating valve in a schematic representation of its switching function.

In contrast to the example according to FIG. 25, a flow passes through a portion of thermally active modules 301 through 312 in the opposite direction in the example according to FIG. 33, namely modules 305 through 310 in the illustrated switching position. The portion of the modules through which the flow passes in the opposite direction changes along with the switching position of rotating valve 100 or its rotating body 115.

Figure 38:
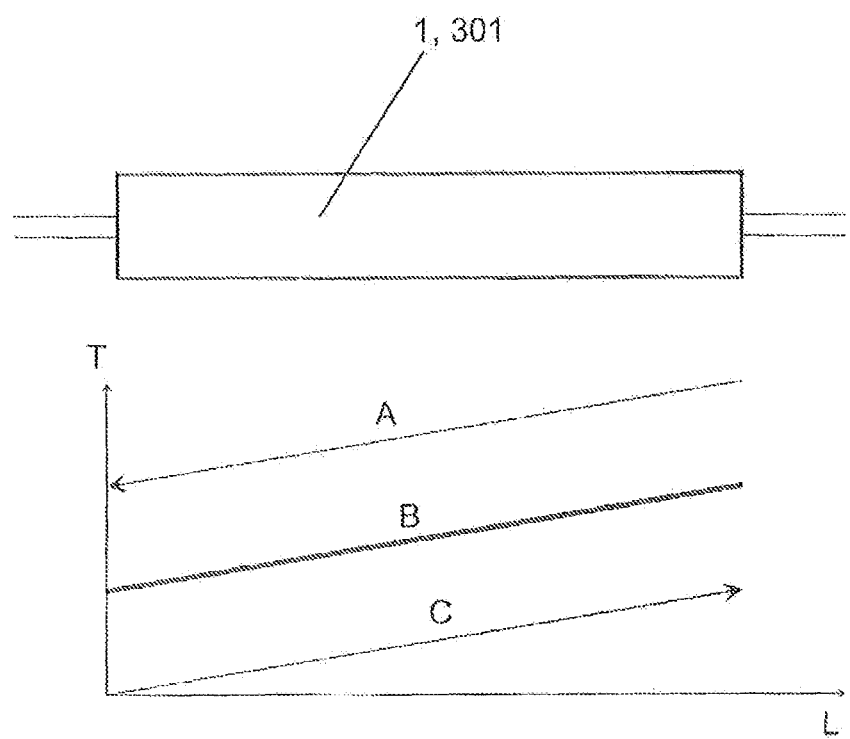
FIG. 38 shows a schematic representation of temperature profiles for the rotating valve according to FIG. 33 through FIG. 37.

Half of modules 301 through 312 are in the sequential through-flow downstream from cooler 118 and upstream from heater 120 (adsorption mode) and the other half is downstream from heater 120 and upstream from cooler 118 (desorption mode). The reversed through-flow provides a better adaptation to the progression of temperature T of modules 301 through 312 over their length L. FIG. 38 shows an illustrative representation of temperature progression A of the fluid during the heating process (downstream from heater 120), of temperature progression B of a module 1 over its length L and of temperature progression C of the fluid during the cooling process. With regard to fluid flows A, C over module 1, the reverse directions are symbolized by arrows.

Of course, the two groups of modules through which the flow passes in parallel may also be of different sizes to take into account different kinetics of the assigned processes.

The structural implementation of the reversal of the direction of flow through modules 301 through 312 is achieved by dead-end channels 165, 166 in rotating body 115. Each of dead-end channels 165, 166 includes two channels, each of which empties into one of annular chambers 131, 132, 133, and 134 via a radially oriented connecting opening. In the example of the switching position according to FIG. 34, the fluid flows from inlet 106 through a channel in dead-end channel 165 into annular chamber 131, from there into annular chamber 132 via cooler 118 and then to outlet 207 through the second channel of dead-end channel 165 in the opposite direction. Outlet 207 is disposed at the same end face of rotating valve 100 as inlet 106.

The inflow and outflow via radially oriented openings from the individual channels of dead-end channels 165, 166 into or out of annular chambers 131 through 134 are each shown by a flow arrow symbol viewed from above: i.e., a circle containing a dot ("arrow tip") for fluid flowing into the annular chambers and a circle containing a cross ("arrow shaft") for the fluid flowing out of the annular chambers.

A similar fluid guidance is located at the opposite end face of the rotating valve for inlet 112, outlet 201, dead-end channel 166 and annular chambers 133, 134, between which heater 120 is disposed.

Dead-end channels 165, 166 result in the special design feature that through-channels 126, which completely surround the rotating body, each have an offset 126a over their progression in rotating body 115 in the circumferential direction of the rotating body (offset angle). The offset corresponds to angular unit of adjacent inlets and outlets of the rotating body, i.e., for example 30 degrees in the specific case of twelve inlets and outlets at each end face. On the whole, this achieves a spatial circumvention of the dead-end channels, on whose plane some of through-channels 126 would otherwise run. The desired serial flow through the connected modules according to FIG. 33 is achieved at the same time.

Figure 34:
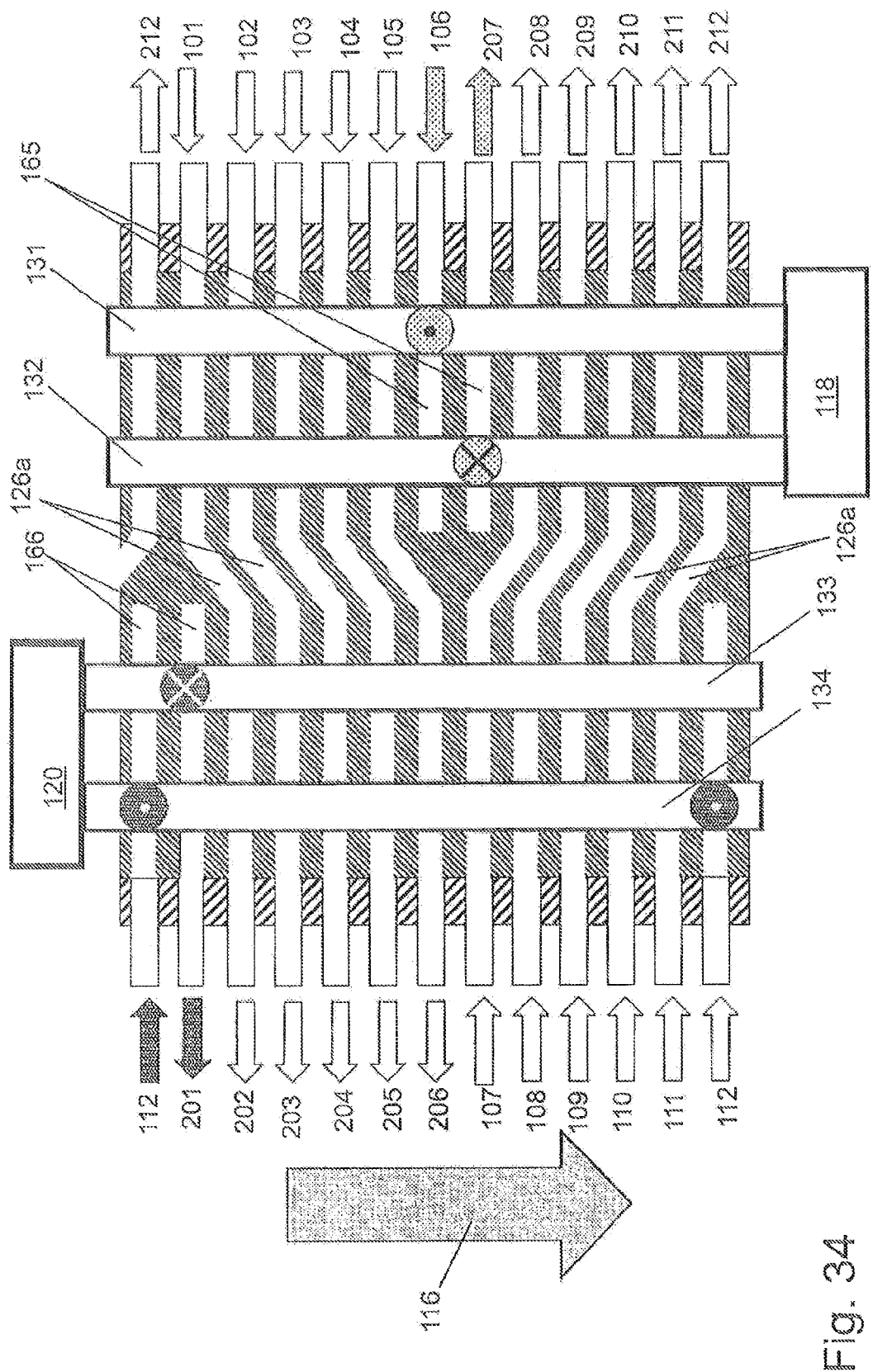
FIG. 34 shows the rotating valve from FIG. 33 in a developed representation in a first switching position.
Figure 35:
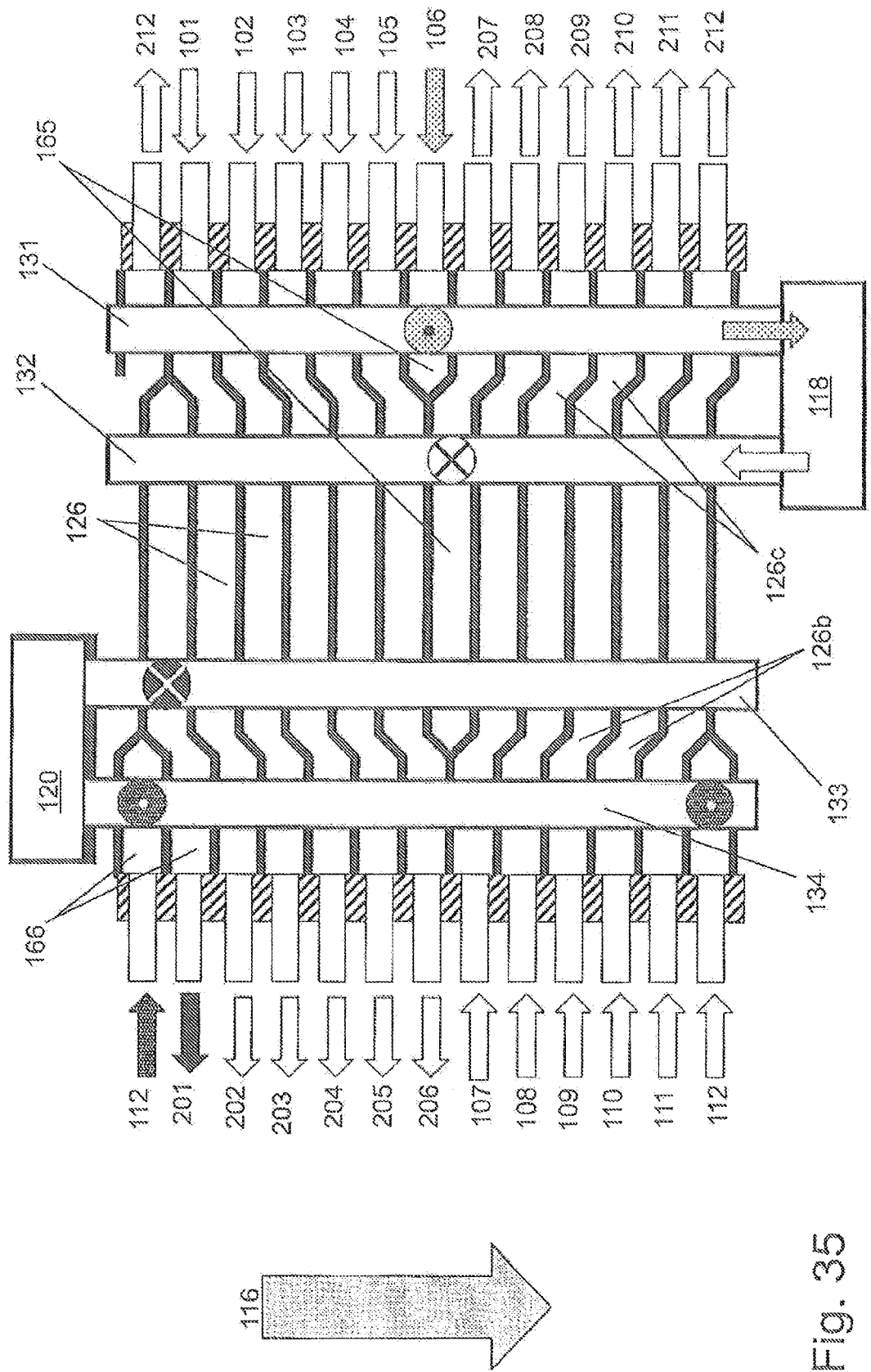
FIG. 35 shows a modification of the rotating valve from FIG. 34.

FIG. 35 shows a modification of the example in FIG. 34, in which this offset 126a is added up from a first partial offset 126b and a second partial offset 126c, the two partial offsets 126b, 126c of a through-channel 126 being disposed in different structural sections of rotating body 115, in the present case, namely, between annular chambers 131 and 132 as well as between annular chambers 133 and 134. This makes it possible to reduce a pressure drop caused by the offset or to simplify the structural implementation overall.

Figure 36:
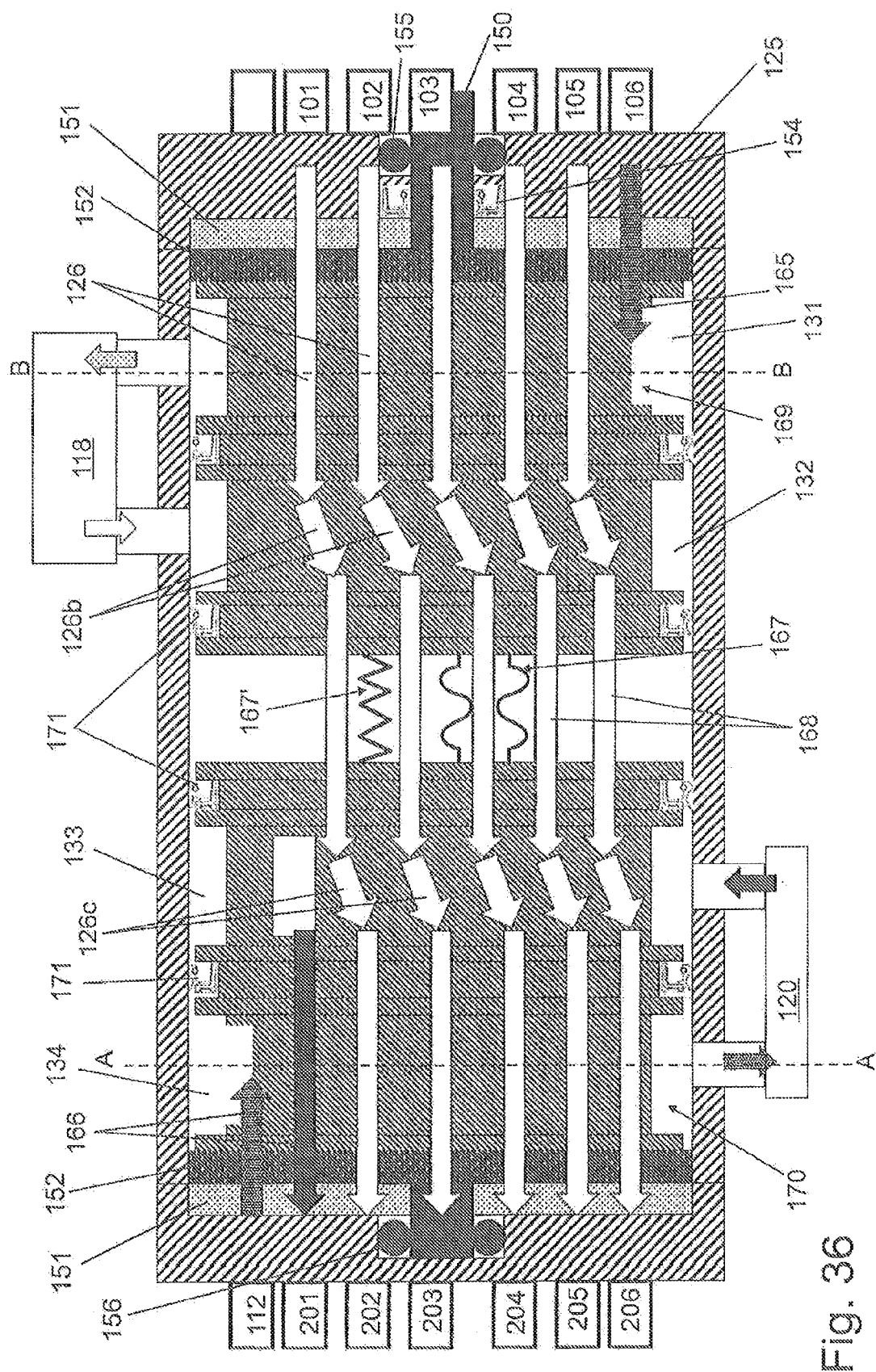
FIG. 36 shows a schematic, structural implementation of the rotating valve from FIG. 35.

FIG. 36 shows a representation of the rotating valve that is similar to the one in FIG. 28, including detailed suggestions for structural implementation. As in FIG. 28, the end face of rotating body 115 is sealed against housing 125 with the aid of pairs of ceramic sealing plates 151, 152, of which one sealing plate 152 rotates together with rotating body 115 and one sealing plate 151 is fixedly mounted in the housing. Alternatively, one sealing plate may be replaced by small, separate sealing disks.

Sealing plates 151, 152 are supported against one another or pressed onto one another by application of force to improve the sealing effect. The force is applied with the aid of a resilient member 167. This member is designed as a plurality of elastic connecting pieces 168, which are compressed during the course of assembly (illustrated schematically for one connecting piece), the connecting pieces being designed as corrugated bellows or hose sections. In an alternative or supplementary specific embodiment, a separate elastic member 167' may also be provided.

The ten connecting pieces 168 according to the number of through-channels 126 are located between a first partial body 169 and a second partial body 170 of rotating body 115. The two partial bodies 169, 170 each include two of annular chambers 131 through 134 and two sealing elements 171 along the circumferential edges of partial bodies 169, 170, by means of which annular chambers 131 through 134 are sealed.

Sealing elements 171 may slide at least over a certain lift in the axial direction, so that an ability of partial bodies 169, 170 to move axially toward one another is possible according to the elastic pretensioning or application of force.

To avoid elastic rotation of partial bodies 169, 170 toward one another, form-locked means which are not illustrated or stops acting in the circumferential direction may also be provided which permit an axial movement of the partial bodies but block them from rotating toward each other.

Alternatively or additionally, an additional spring may be provided between the partial bodies in order to apply a pretensioning force to sealing plates 151, 152.

Shaft 150 of rotating body 115 is supported on bearings 155, 156 and using a shaft seal 154, as in the example according to FIG. 28. The shaft may be designed in two parts or only have shaft journals on the end faces, according to the two partial bodies 169, 170. Depending on the requirements, the shaft may also be a continuous shaft 150 on which partial bodies 169, 170 are placed to allow movement in the axial direction.

Figure 37:
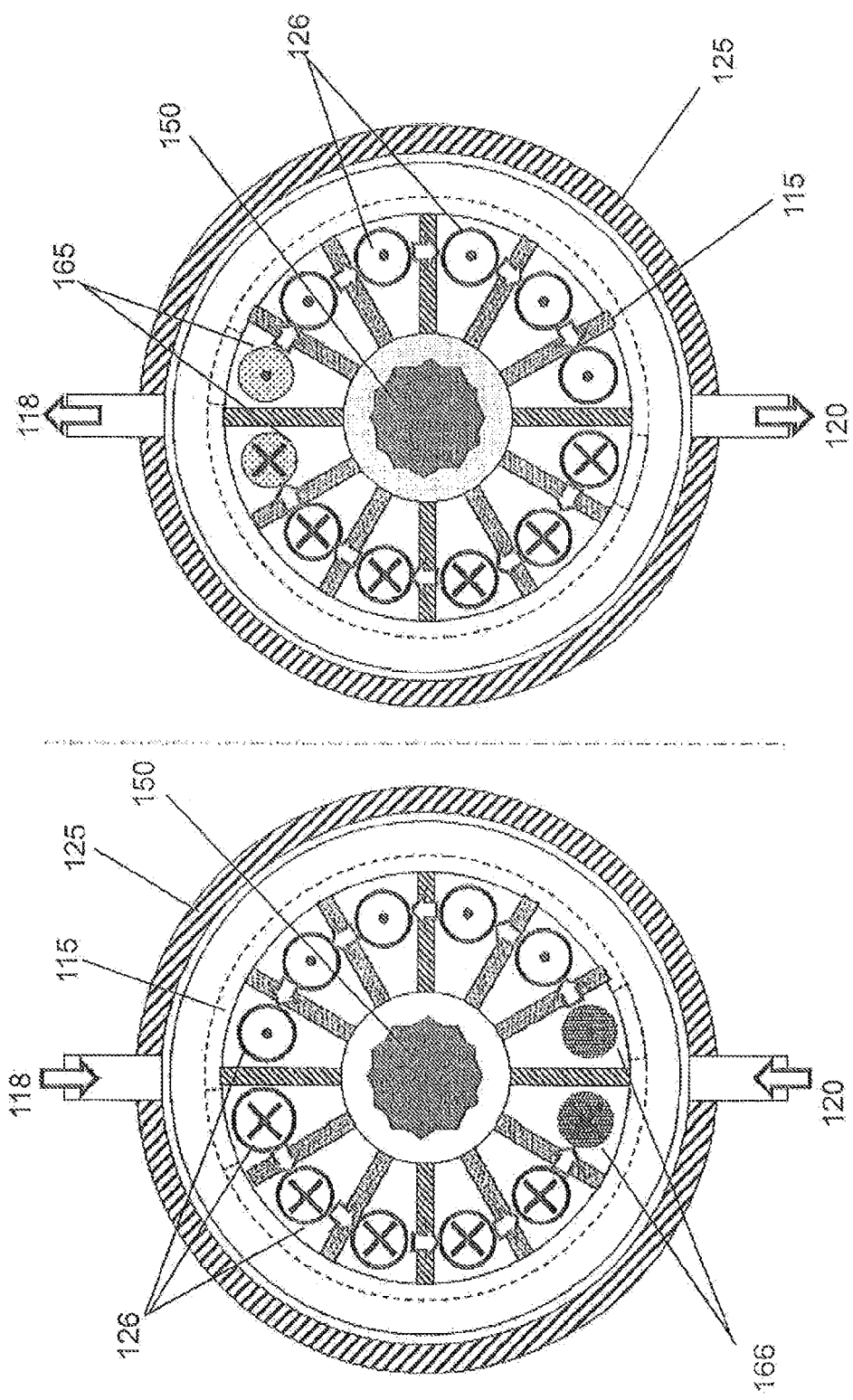
FIG. 37 shows schematic sectional views along lines A-A and B-B from FIG. 36.

For further illustration, FIG. 37 shows sectional views of rotating valve 100 along section lines A-A and B-B from FIG. 28. The upper radial connections each lead to heater 120 and the lower radial connections to cooler 118. Dead-end channels 165 and 166 as well as through-channels 125 through which the flow passes in different directions are also apparent.

It is understood that the particular features of the individual exemplary embodiments may be reasonably combined with each other, depending on the requirements.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A rotating valve, comprising:
an inlet region that has a plurality of stationary, separate inlets for multiple flows of a fluid;
an outlet region that has an equal amount of plurality of stationary, separate outlets with respect to the separate inlets for the flows of the fluid; and
a switching region having a switching member that is rotatable around an axis is arranged between the inlet region and the outlet region,
wherein the plurality of inlets are connectable in a first position of the switching member to the plurality of outlets in a first assignment,
wherein the plurality of inlets are connectable in a second position of the switching member to a plurality of outlets in a second assignment,
wherein the switching member includes a plurality of openings through which the fluid flows axially in a direction of a rotation axis and which are movable together with the switching member, the plurality of openings alternately covering a plurality of stationary, axially oriented openings during a course of the rotation of the switching member, and
wherein the different assignments of the inlets to the outlets are carried out by the alternating covering of the axially oriented openings.

2. The rotating valve according to claim 1, wherein the switching member is configured as an axial longitudinal body which is accommodated in a stationary, largely cylindrical wall, and wherein either the inlets or the outlets are connectable via radially oriented openings in the wall.

3. The rotating valve according to claim 2, wherein the longitudinal body has a number of axially oriented, separate channels that correspond to the plurality of inlets for the fluid flows, each channel having a radial opening for connection to one of the openings in the wall.

4. The rotating valve according to claim 2, wherein at least one of the two, longitudinal body or wall has annular circumferential sealing members that interact with the other of the two, longitudinal body or wall to form a seal so that the openings in the wall are separated from each other.

5. The rotating valve according to claim 4, wherein the sealing members include a seal which is accommodated on radial projections of at least one of the two, longitudinal body or wall.

6. The rotating valve according to claim 4, wherein the sealing members form a single piece with the longitudinal body and/or the wall.

7. The rotating valve according to claim 2, wherein the longitudinal body is a one-piece component.

8. The rotating valve according to claim 2, wherein the longitudinal body includes a plurality of longitudinal body elements that are stacked in the axial direction.

9. The rotating valve according to claim 8, wherein at least some of the longitudinal elements are designed as equivalent parts.

10. The rotating valve according to claim 1, wherein a rotational shaft engages with the switching member in the axial direction, the shaft being configured as a tension member for holding multiple components of the switching member disposed consecutively in the axial direction.

11. The rotating valve according to claim 1, wherein the switching member is rotationally supported on a bearing member at one end face, the bearing member having a rotating seal for sealing the fluid.

12. The rotating valve according to claim 1, wherein the number of inlets and outlets is at least four or at least eight.

13. A rotating valve comprising:
an inlet region that has a plurality of stationary, separate inlets for multiple flows of a fluid;
an outlet region that has a same number of stationary, separate outlets with respect to the separate inlets for the flows of the fluid; and
a switching region having a switching member configured to rotate around an axis formed between the inlet region and the outlet region,
wherein the plurality of inlets are connectable in a first position of the switching member to the plurality of outlets in a first assignment,
wherein the plurality of inlets are connectable in a second position of the switching member to the plurality of outlets in a second assignment,
wherein the switching member is configured as a longitudinal body having a plurality of partition walls that form parallel channels and extend in the axial direction, and
wherein a separate seal extends in the axial direction and is arranged in end regions of the partition walls in a radial direction, the partition walls being supported leak-proof by the seal against a cylindrical wall, which includes the switching member.

14. The rotating valve according to claim 13, wherein the seal has a U-shaped, H-shaped or X-shaped cross-section.

15. The rotating valve according to claim 13, wherein the seal has an elastic sealing tab which rests against the cylindrical wall.

16. The rotating valve according to claim 13, wherein the seal is insertable in a form-locked manner into a groove in the partition wall.

17. The rotating valve according to claim 13, wherein the channels alternately cover radially oriented openings in an inner wall of a stationary inner cylinder that are offset in a circumferential direction, and wherein in order to change the assignment, separate annular chambers, disposed consecutively in the axial direction, are arranged between the inner cylinder and an outer housing surrounding the inner cylinder.

18. A rotating valve comprising:
an inlet region having a plurality of stationary, separate inlets for multiple flows of a fluid;
an outlet region having an identical number of plurality of stationary, separate outlets with respect to the separate inlets for the flows of the fluid; and
a switching region having a switching member that is rotatable around an axis and is arranged between the inlet region and the outlet region,
wherein the plurality of inlets are connectable in a first position of the switching member to the plurality of outlets in a first assignment,
wherein the plurality of inlets are connectable in a second position of the switching member to the plurality of outlets in a second assignment,
wherein the switching member is configured as a longitudinal body having a plurality of partition walls that form parallel channels and extend in the axial direction, each of the channels being connectable to one of multiple annular grooves of the switching member that are concentric in relation to the rotation axis, and
wherein each of the annular grooves covers a stationary opening of the inlets or outlets.

19. The rotating valve according to claim 18, wherein the channels alternately cover radially oriented openings in an inner wall of a stationary inner cylinder that are offset in a circumferential direction in order to change the assignment, and wherein separate annular chambers are disposed consecutively in the axial direction between the inner cylinder and an outer housing surrounding the inner cylinder.

20. The rotating valve according to claim 18, wherein at least one inlet of the plurality of inlets is connected to a corresponding outlet in a first heat exchanger assignment via a first heat exchanger, wherein at least one further inlet of the plurality of inlets is connected to a corresponding outlet in a second heat exchanger assignment via a second heat exchanger, and wherein the remaining inlets of the plurality of inlets are each connected to associated outlets in a passage assignment via a through-channel.

21. The rotating valve according to claim 18, wherein the switching member has a rotating body that has a large number of through-channels that are configured to connect the other inlets in the passage assignment to the associated outlets.

22. The rotating valve according to claim 21, wherein the through-channels extend through the rotating body in the axial direction.

23. The rotating valve according to claim 21, wherein multiple annular chambers extend around the rotating body and are each connected to one of the inlets and/or one of the outlets as a function of a position of the rotating body.

24. The rotating valve according to claim 23, wherein two of the annular chambers are connectable to each other in pairs via one of the heat exchangers.

25. The rotating valve according to claim 23, wherein the annular chambers are connectable in pairs to one of the inlets or one of the outlets via radial openings and a connecting channel that is interrupted in the axial direction.

26. The rotating valve according to claim 21, wherein the rotating body is configured to rotate in steps in a stationary housing such that the inlets are successively connectable to associated outlets via different through-channels or annular chambers and one of the heat exchangers.

27. The rotating valve according to claim 19, wherein the housing is configured as a hollow circular cylinder.

28. The rotating valve according to claim 21, wherein the rotating body includes a plurality of longitudinal body elements that are stacked in the axial direction.

29. The rotating valve according to claim 28, wherein at least some of the longitudinal body elements are designed as equivalent parts.

30. The rotating valve according to claim 20, wherein the flow passes through a first number of through-channels of the rotating valve in a first flow direction, and wherein the flow passes through a second number of through-channels of the rotating valve in a second flow direction which is opposite the first flow direction.

31. The rotating valve according to claim 30, wherein at least one inlet and one outlet of the rotating valve is connectable to a dead-end channel of the rotating valve, and wherein the inlet and the outlet of the dead-end channel empty at a same end face of the rotating valve.

32. The rotating valve according to claim 30, wherein both the first number of through-channels and the second number of through-channels have an offset over their length in a circumferential direction of the rotating valve in an amount of an angular distance between adjacent inlets and outlets.

33. The rotating valve according to claim 32, wherein the offset of a through-channel includes at least one first partial offset and one second partial offset in structural sections of the rotating valve disposed consecutively in the axial direction.

34. The rotating valve according to claim 1, wherein a rotating body of the rotating valve has a rotating sealing plate that rests against a stationary sealing plate of a housing and forms a seal over a wide area in the axial direction, the sealing plates being made of a ceramic material.

35. The rotating valve according to claim 1, wherein a rotating body of the rotating valve includes two partial bodies disposed consecutively in the axial direction, the partial bodies being supported against each other in the axial direction under the application of force.

36. The rotating valve according to claim 35, wherein a resilient member is provided between the partial bodies, and wherein the resilient member is configured as elastic connecting pieces for connecting through-channels of the partial bodies.

37. A heat pump comprising:
a plurality of hollow elements;
at least one first zone and one second zone arranged in each of the hollow elements for moving a working medium disposed in the hollow element as a function of thermodynamic status variables, each of the hollow elements being thermally connected by its first zone to a first flow channel of the hollow element through which a first fluid flows and thermally connected by its second zone to a second flow channel of the hollow element through which a second fluid flows so that thermal energy is exchanged between one of the fluids and one of the zones and a valve configuration,
wherein the flow channels of one of the zones are sequentially interconnectable to each other via the valve configuration and a sequence of the interconnections are changed via the valve configuration during a course of operating the heat pump, and
wherein the valve configuration includes a rotating valve, the rotating valve comprising:
an inlet region that has a plurality of stationary, separate inlets for multiple flows of a fluid;
an outlet region that has an equal amount of plurality of stationary, separate outlets with respect to the separate inlets for the flows of the fluid; and
a switching region having a switching member that is rotatable around an axis is arranged between the inlet region and the outlet region,
wherein the plurality of inlets are connectable in a first position of the switching member to the plurality of outlets in a first assignment,
wherein the plurality of inlets are connectable in a second position of the switching member to a plurality of outlets in a second assignment,
wherein the switching member includes a plurality of openings through which the fluid flows axially in a direction of a rotation axis and which are movable together with the switching member, the plurality of openings alternately covering a plurality of stationary, axially oriented openings during a course of the rotation of the switching member, and
wherein the different assignments of the inlets to the outlets are carried out by the alternating covering of the axially oriented openings.

38. The heat pump according to claim 37, wherein the hollow elements are configured as adsorber elements, the adsorber elements having an adsorption/desorption region for the working medium in a region of the first zone and a condensation/evaporation region for the working medium in a region of the second zone.

39. The heat pump according to claim 37, wherein at least one of the flow channels has connecting pieces on the flow channels end, the fluid being distributed to a plurality of flow paths in a region of the connecting pieces.

40. The heat pump according to claim 37, wherein one or multiple flow paths for the fluid is provided by a gap between subelements that are disposed on top of each other.

41. The heat pump according to claim 37, wherein the through-flow channels are provided with surface-enlarging structures or ribs.

42. The heat pump according to claim 37, wherein the hollow elements are each designed as separate modules, which are not in thermal contact with each other.

43. The heat pump according to claim 42, wherein a layer of thermally insulating or elastic material is disposed between adjacent hollow elements.

44. The heat pump according to claim 37, wherein the valve configuration is designed as an interconnection of a number of discrete electromagnetically actuated multi-way valves.

45. The heat pump according to claim 37, wherein the valve configuration includes at least one or at least two rotating valves.

46. The heat pump according to claim 45, wherein at least some of the flow channels of the hollow elements are connectable to the inlets and/or outlets of the rotating valve via elastically deformable connecting pieces.

47. The heat pump according to claim 37, wherein the second fluid is air.

48. The heat pump according to claim 37, wherein the rotating valve of the second fluid has a switching member that includes a partition wall that is coiled in a stepped manner, wherein a number of steps of the coil correspond to a number of hollow elements.

49. The heat pump according to claim 48, wherein the switching member is formed from a plurality of switching member elements that are designed as equivalent parts and are disposed consecutively in the axial direction.

50. The heat pump according to claim 37, wherein the second fluid is distributed over the second zones of the hollow elements via a rotating valve having two flow channels.

* * * * *